United States Patent
Pusz et al.

(10) Patent No.: US 9,880,815 B2
(45) Date of Patent: Jan. 30, 2018

(54) SQL VISUALIZER

(71) Applicants: Grzegorz Roman Pusz, Wroclaw (PL); Neil Thomson, Inverness (GB)

(72) Inventors: Grzegorz Roman Pusz, Wroclaw (PL); Neil Thomson, Inverness (GB)

(73) Assignee: APTITUDE SOFTWARE LIMITED, Hampshire (GB)

( * ) Notice: Subject to any disclaimer, the term of this patent is extended or adjusted under 35 U.S.C. 154(b) by 0 days.

(21) Appl. No.: 13/746,895

(22) Filed: Jan. 22, 2013

(65) Prior Publication Data

US 2014/0208293 A1    Jul. 24, 2014

(51) Int. Cl.
*G06F 9/44*       (2006.01)
*G06F 17/30*      (2006.01)

(52) U.S. Cl.
CPC .......... *G06F 8/34* (2013.01); *G06F 8/73* (2013.01); *G06F 17/30398* (2013.01)

(58) Field of Classification Search
CPC ..... G06F 8/30; G06F 8/31; G06F 8/34; G06F 8/40; G06F 8/51; G06F 17/30404; G06F 17/30427; G06F 17/30834; G06F 17/30398; G06F 17/30932
See application file for complete search history.

(56) References Cited

U.S. PATENT DOCUMENTS

| | | | | |
|---|---|---|---|---|
| 5,428,737 | A * | 6/1995 | Li | G06F 17/30398 |
| 5,428,776 | A * | 6/1995 | Rothfield | G06F 17/30398 |
| 5,471,613 | A * | 11/1995 | Banning et al. | |
| 6,470,335 | B1 * | 10/2002 | Marusak | G06F 17/30398 |
| 6,704,724 | B1 | 3/2004 | Ellmann et al. | |
| 2003/0093408 | A1 * | 5/2003 | Brown | G06F 17/30336 |
| 2010/0293523 | A1 * | 11/2010 | Ahadian | G06F 8/10 717/108 |
| 2011/0161371 | A1 | 6/2011 | Thomson et al. | |
| 2012/0284255 | A1 * | 11/2012 | Schechter | G06F 17/30398 707/718 |

FOREIGN PATENT DOCUMENTS

| | | |
|---|---|---|
| CN | 101464862 | 6/2009 |
| EP | 0541298 | 5/1993 |
| EP | 0583053 | 2/1994 |
| WO | 02/069139 | 9/2002 |

OTHER PUBLICATIONS

DB Optimizer User Guide Version 3.5, Embarcadero, Apr. 9, 2012, 254 pages, [retrieved on May 10, 2014], Retrieved from the Internet: <URL:http://docs.embarcadero.com/products/db_optimizer/3.5/DBOptimizer_3.5_UserGuide_EN.pdf>.*

Mimer SQL Reference Manual Version 8.2, Mimer Information Technology AB, 2000, 386 pages, [retrieved on May 10, 2014], Retrieved from the Internet: <URL:http://developer.mimer.com/documentation/pdf_82/sqlref.pdf>.*

(Continued)

*Primary Examiner* — Geoffrey St Leger

(74) *Attorney, Agent, or Firm* — Thompson Hine LLP

(57) ABSTRACT

A SQL Visualizer including means for transforming a textual SQL statement into a graphical diagram which represents the textual SQL statement.

20 Claims, 27 Drawing Sheets

(56) References Cited

OTHER PUBLICATIONS

Walk-through: Using SQL Dependency Tracker, Red Gate Software Ltd., 2010, 15 pages, [retrieved on Dec. 4, 2014], Retrieved from the Internet: <URL:https://web.archive.org/web/20100312102556/http://www.red-gate.com/products/SQL_Dependency_Tracker/walkthrough1/step1.htm>.*
Tartir, S., et al., SQLFlow: PL/SQL Multi-Diagrammatic Source Code Visualization, International Arab Conference on Information Technology ACIT, 2005, 5 pages, [retrieved on Jul. 7, 2015], Retrieved from the Internet: <URL:http://citeseerx.ist.psu.edu/viewdoc/download?doi=10.1.1.90.7362&rep=rep1&type=pdf>.*
Database Workbench 3 documentation, Upscene, Mar. 26, 2009, 4 pages, [retrieved on Apr. 27, 2016], Retrieved from the Internet: <URL:https://web.archive.org/web/20090421032308/http://www.upscene.com/documentation/dbw3/index.html?oe_storedprocedureeditor.htm>.*
Ramos, H. B., IQL: A Graphical Interface for Full SQL Queries, Database and Expert Systems Applications, 1992, pp. 308-313, [retrieved on Jan. 30, 2017], Retrieved from the Internet: <URL:https://link.springer.com/chapter/10.1007/978-3-7091-7557-6_53/>.*
Siau, K. L., et al., Visual Knowledge Query Language as a Front-end to Relational Systems, Proceedings of the Fifteenth Annual International Computer Software and Applications Conference, Sep. 11-13, 1991, pp. 373-378, [retrieved on Jan. 31, 2017], Retrieved from the Internet: <URL:http://ieeexplore.ieee.org/>.*
Visionary User's Guide, version 1.0, Chapter 3: Creating Data Sources, Informix Software, 1998, 33 pages, [retrieved on Jan. 31, 2017], Retrieved from the Internet: <URL:http://www.oninit.com/manual/informix/english/docs/visionary/infoshelf/vis_ug/datasrc.fml.html#121533>.*
Murakawa, T., et al., Graphical Expression of SQL Statements Using Clamshell Diagram, IEICE Transactions on Information and Systems, vol. E93-D, No. 4, Apr. 2010, pp. 713-720, [retrieved on Jan. 30, 2017], Retrieved from the Internet: <URL:https://www.jstage.jst.go.jp/article/transinf/E93.D/4/E93.D_4_713/_pdf>.*
European Search Report and Opinion, European Application No. EP 14151649 (dated Mar. 14, 2014).
Cerullo et al. "A System for Database Visual Querying and Query Visualization: Complementing Text and Graphics to Increase Expressiveness", Database and Expert Systems Applications, 2007. DEXA '07. 18th International Conference on, IEEE, Piscataway, NJ, USA, Sep. 2007 (Sep. 2007), pp. 109-113.
Danaparamita et al. "QueryViz: Helping Users Understand SQL Queries and their Patterns", Extending Database Technology, pp. 558-561 (Mar. 2011).
GB, Combined Search and Examination Report under Sections 17 and 18(3); Patent Application No. GB1301864.3 (dated Aug. 5, 2013).
EP, Office Action, European Patent Application No. 14151649.2 (dated Jul. 4, 2016).

* cited by examiner

CONTINUED ON SHEET 8 / 27

Database or Schema: APTITUDE

Owner:

Temporary: ☐

| Name | Type Name | Primary Key |
|---|---|---|
| △ ID | Numeric | ☑ |
| PERSON_ID | Numeric | ☐ |
| STREET | String | ☐ |
| CREATED | DateTime | ☐ |

SQL Hints

OK  Cancel  Help

Figure 5 (Continued)

| Verana ▽ |

Editor for My Projects\Database\NewGeneratedSqlRule (Oracle)    ✕

☐ Settings

Statement Type:  SELECT  ▷

| Atributes | Parameters |

| | Name | Gener |
|---|---|---|
| △ | CUSTOMER_NAME | String |
| | SALE_ORDER_ID | Numeri |
| | ORDER_DATE | DateTi |

```
1  SELECT
2      CONTACT.NAMES AS CUSTOMER_NAME
3      SALE_ORDER.SALE_ORDER_ID AS SALE_ODER_ID,
4      SALE_ORDER.ORDER_DATE AS ORDER_DATE
5  FROM
6      SALE_ORDER
7      INNER JOIN CUSTOMER ON CUSTOMER.CUSTOMER_ID = SALE_ORDER.CUSTOMER_ID
8      INNER JOIN CONTACT ON CUSTOMER.CONTACT_ID = CONTACT.CONTACT_ID
9  WHERE
10     CUSTOMER.CUSTOMER_ID = : (GIVEN_CUSTOMER_ID)
```
↙ 30

Figure 6 (Continued)

Editor for My Projects\Database\NewGeneratedSqlRule (Oracle)

☐ Settings

Statement Type: SELECT ▷

Atibutes | Parameters

| Name | Gener |
|---|---|
| △ CUSTOMER_NAME | String |
| SALE_ORDER_ID | Numeri |
| ORDER_DATE | DateTi |

```
 1 ⊟SELECT
 2     CONTACT.NAMES AS CUSTOMER_NAME
 3     SALE_ORDER.SALE_ORDER_ID AS SALE_ODER_ID,
 4     SALE_ORDER.ORDER_DATE AS ORDER_DATE
 5   FROM
 6     SALE_ORDER
 7     INNER JOIN CUSTOMER ON CUSTOMER.CUSTOMER_ID = SALE_ORDER.CUSTOMER_ID
 8     INNER JOIN CONTACT ON CUSTOMER.CONTACT_ID = CONTACT.CONTACT_ID
 9   WHERE
10     CUSTOMER.CUSTOMER_ID = :(GIVEN_CUSTOMER_ID)
11     AND
12     CONTACT.NAME like "%Company"  ← 30
```

Figure 7 (Continued)

```
Microgen Aptitude 4.10.0.0
File Edit Debugger View Tools Windows Help

Oracle  ▽ 11g  ▽ DaBClarity Tutori ▽

Database
  DBClarity Tutorial Generic
    Intergration
    Others
    Project Properties
    Schema
    SQL Procedure Tutorial
    SQL Rule Tutorial New SQL Elements from SQL Statement Input  ✕

1  CREATE OR REPLACE PROCEDURE Price_Validation
 2  AS
 3    validPrice NUMBER (38);
 4    errorCode NUMBER (38) DEFAULT 1;
 5    errorMessage VARCHAR2 (4000) DEFAULT 'Unknown Error';
 6    vProductID NUMBER (38);
 7    vSupplierID NUMBER (38);
 8  BEGIN
 9    <<GetProductPrices>>
10    FOR productPrices IN
11    (
12      SELECT
13          SUPPLIER_PRODUCT.SUPPLIER_ID AS SUPPLIER_ID,
14          PRODUCT.PRODUCT_ID AS PRODUCT_ID,
15          PRODUCT.UNIT_PRICE AS SALE_PRICE,
16          SUPPLIER_PRODUCT.SUPPLIER_PRICE AS SUPPLIER_PRICE
17      FROM
18          PRODUCT
19          INNER COIN SUPPLIER_PRODUCT ON PRODUCT.PRODUCT_ID = SUPPLIER_PRODU
20    LOOP
21      IF productPrices.SUPPLIER_PRICE < productPrices.SALE_PRICE THEN
22          validPrice := 1;
23      ELSE
24          validPrice := 0;
25      END IF;
26      vProductID := productPrices.PRODUCT_ID;
27      vSupplierID := productPrices.SUPPLIER_ID;
28      UPDATE PRODUCT
29          SET
30
```

20

CONTINUED ON SHEET 19 / 27

Figure 9

CONTINUED ON SHEET 24 / 27

```
31              VALID_PRICE = validPrice
32          WHERE
33              PRODUCT.PRODUCT_ID = vProductID;
34          UPDATE SUPPLIER_PRODUCT
35          SET
36              VALID_PRICE = validPrice
37          WHERE
38              (SUPPLIER_PRODUCT.PRODUCT_ID = vProductID) AND (SUPPLIER_PRODUCT.SUP
39      END LOOP Loop1;
40  EXCEPTION
41      WHEN OTHERS THEN
42          InsertError(errorCode, errorMessage);
43  END
44
```

- DBSNMP
- DIP
- EXFSYS
- FLOWS_FILES
- HR
- IX
- MDDATA
- MDSYS
- MGMT_VIEW
- OE
- OLAPSYS
- ORACLE_OCM
- ORDDATA
- ORDPLUGINS
- ORDSYS
- ORDSYS_AUDIT
- PM

Stored Procedure: LOOPDYNSQLRULE
Status: VALID
Object Id: 75242

Workspace | DBClarity Tutorial Gene | Line 40/43 Column:5   Selection: 0   Insert Figure 11 (Continued)

SQL VISUALIZER

FIELD

The invention relates to the conversion of the textual representation of database SQL statements and procedures into a graphical representation. The purpose of this process is to present the database statements and procedures in a form which is much closer to the logical structure of the underlying process, easier to manipulate, more transparent as to its function and less prone to erroneous development.

The features described herein can be implemented as a part of Microgen Aptitude V4.1-a program with a graphical interface which allows users to create complex applications without knowledge of traditional programming languages.

BACKGROUND

It is important that developers are able to easily see the logical structure of database SQL statements and procedures as it makes their work faster, more effective and less error prone. The current textual representation of SQL statements and procedures is difficult to understand due in part to the declarative nature of the language and the rather awkward syntax.

In practice, SQL statements and procedures are often very long, containing hundreds or even thousands of lines of text; this makes code analysis very difficult and time consuming. Moreover, the textual representation is frequently obscure and it is difficult to understand the function of the code.

We provide a way to make working with SQL statements and procedures easier, faster and less error prone by transforming SQL from its textual form into diagrams. The "language" underlying these diagrams has been designed to describe all aspects of the SQL language in a clear and unambiguous manner and, moreover, to allow the SQL to be structured in a manner which makes the underlying logic very clear. For example, text based SQL places the end result of the statement (insert into . . . for example) at the beginning while we provide a diagrammatic language which allows it to be placed at the end.

Modification of the code is much easier when the graphic language is used because the logic is transparent. It is also much easier to group the entities within a diagram so that the structure of the program can be very readily seen, in contrast for example to a long SQL program with little visual segmentation or structuring.

The features described herein make it possible to switch between the textual and graphical representations in either direction so the results of changes can be readily seen. To achieve this we provide a product which has two converters: "SQL Text to SQL Diagram" and "SQL Diagram to SQL Text". The latter converter is the subject of the applicant's U.S. patent application Ser. No. 12/648,660, published as US 2011/0161371, the entire contents of which are incorporated by reference herein, which includes a description of Aptitude SQL Rules and Aptitude SQL Procedures. Note that this allows changes to the program to be made to either representation, i.e. textual or graphical, and then the other representation is re-generated.

The product described herein is not limited to the visualization of SQL Statements but also covers the Database procedures which are written in languages proprietary to the database, e.g. PL/SQL for Oracle. The product described herein understands the SQL Procedures languages for Oracle, Microsoft SQL Server and Teradata V14, at least.

SUMMARY

In one embodiment the invention provides a SQL Visualizer comprising means for transforming a textual SQL statement into a graphical diagram which represents the textual SQL statement.

The invention may also include any of the following features, which may be combined in any combination.

The graphical diagram which represents the textual SQL statement may be an Aptitude SQL Rule.

The SQL Visualizer may further comprises means for transforming a textual DML statement into a graphical diagram which represents the textual DML statement.

The graphical diagram which represents the textual DML statement may be an Aptitude SQL Rule.

The graphical diagram which represents the textual SQL statement and the graphical diagram which represents the textual DML statement may be both contained in the same Aptitude SQL Rule.

The SQL Visualizer may further comprise means for transforming a textual SQL procedure into a graphical diagram which represents the textual SQL procedure.

The graphical diagram which represents the textual SQL procedure may be an Aptitude SQL Procedure.

If the textual SQL procedure contains embedded SQL statements, the means for transforming a textual SQL procedure into a graphical diagram may automatically produce separate Aptitude SQL Rules corresponding with the embedded SQL statements, that are placed within the Aptitude SQL Procedure.

The SQL Visualizer may further comprise means for transforming a textual DDL command into a graphical diagram which represents the textual DDL command.

The graphical diagram which represents the textual DDL command may be an Aptitude SQL Procedure.

The graphical diagram which represents the textual SQL procedure and the graphical diagram which represents the textual DDL command can be both contained in the same Aptitude SQL Procedure.

The SQL Visualizer may further comprise a user interface comprising an editor into which a user may place textual elements prior to their conversion graphical form.

The editor can be arranged to receive textual SQL statements, DML statements, SQL procedures and/or DDL commands.

The user interface may comprise a dictionary selection control which allows a user to select a database used in the textual SQL statement, and to thereby provide a definition for the database for use in transforming the textual SQL statement into the graphical diagram which represents the textual SQL statement.

The dictionary selection control may allow selection of at least one of the following: Project EDF (External Data Format), Data Schema, and Database Server.

The SQL Visualizer may allow a user to create textual SQL statements and SQL procedures from graphical Aptitude SQL Rules and SQL Procedures.

The SQL Visualizer may allow a user to switch between textual and graphical representations of the same SQL statement or SQL procedure.

A user may be able to make changes to either the graphical or the textual representation of a SQL statement or SQL procedure, and the SQL Visualizer can then automatically generate the other of the graphical or the textual representation such that the same change is incorporated in both the textual representation and the graphical representation.

The graphical and textual representations may be automatically synchronized.

The invention can also be defined by any one of the following numbered paragraphs, which contain multiple dependencies suitable for providing support for claims in applications filed outside of the US.

1. A SQL Visualizer comprising means for transforming a textual SQL statement into a graphical diagram which represents said textual SQL statement.

2. A SQL Visualizer as defined in paragraph 1, wherein said graphical diagram which represents said textual SQL statement is an Aptitude SQL Rule.

3. A SQL Visualizer as defined in paragraph 1 or 2, which further comprises means for transforming a textual DML statement into a graphical diagram which represents said textual DML statement.

4. A SQL Visualizer as defined in paragraph 3, wherein said graphical diagram which represents said textual DML statement is an Aptitude SQL Rule.

5. A SQL Visualizer as defined in all of paragraphs 1 to 4, wherein said graphical diagram which represents said textual SQL statement and said graphical diagram which represents said textual DML statement are both contained in the same Aptitude SQL Rule.

6. A SQL Visualizer as defined in any preceding paragraph, which further comprises means for transforming a textual SQL procedure into a graphical diagram which represents said textual SQL procedure.

7. A SQL Visualizer as defined in paragraph 6, wherein said graphical diagram which represents said textual SQL procedure is an Aptitude SQL Procedure.

8. A SQL Visualizer as defined in paragraph 7, wherein if said textual SQL procedure contains embedded SQL statements, said means for transforming a textual SQL procedure into a graphical diagram automatically produces separate Aptitude SQL Rules corresponding with said embedded SQL statements, that are placed within the Aptitude SQL Procedure.

9. A SQL Visualizer as defined in any preceding paragraph, which further comprises means for transforming a textual DDL command into a graphical diagram which represents said textual DDL command.

10. A SQL Visualizer as defined in paragraph 9, wherein said graphical diagram which represents said textual DDL command is an Aptitude SQL Procedure.

11. A SQL Visualizer as defined in paragraph 10 when also dependent at least on paragraph 7, wherein said graphical diagram which represents said textual SQL procedure and said graphical diagram which represents said textual DDL command are both contained in the same Aptitude SQL Procedure.

12. A SQL Visualizer as defined in any preceding paragraph, which further comprises a user interface comprising an editor into which a user may place textual elements prior to their conversion graphical form.

13. A SQL Visualizer as defined in paragraph 12, wherein said editor is arranged to receive textual SQL statements, DML statements, SQL procedures and/or DDL commands.

14. A SQL Visualizer as defined in paragraph 12 or 13, wherein said user interface comprises a dictionary selection control which allows a user to select a database used in said textual SQL statement, and to thereby provide a definition for said database for use in transforming said textual SQL statement into said graphical diagram which represents said textual SQL statement.

15. A SQL Visualizer as defined in paragraph 14, wherein said dictionary selection control allows selection of at least one of the following: Project EDF (External Data Format), Data Schema, and Database Server.

16. A SQL Visualizer as defined in any preceding paragraph, which also allows a user to create textual SQL statements and SQL procedures from graphical Aptitude SQL Rules and SQL Procedures.

17. A SQL Visualizer as defined in paragraph 16, which allows a user to switch between textual and graphical representations of the same SQL statement or SQL procedure.

18. A SQL Visualizer as defined in any preceding paragraph, in which a user can make changes to either the graphical or the textual representation of a SQL statement or SQL procedure, and the SQL Visualizer can then automatically generate the other of the graphical or the textual representation such that the same change is incorporated in both the textual representation and the graphical representation.

19. A SQL Visualizer as defined in paragraph 18, wherein said graphical and textual representations are automatically synchronized.

The invention can also provide a method of providing a visualization of a textual SQL statement which comprises transforming the textual SQL statement into a graphical diagram which represents the textual SQL statement.

DETAILED DESCRIPTION

Figure 1:
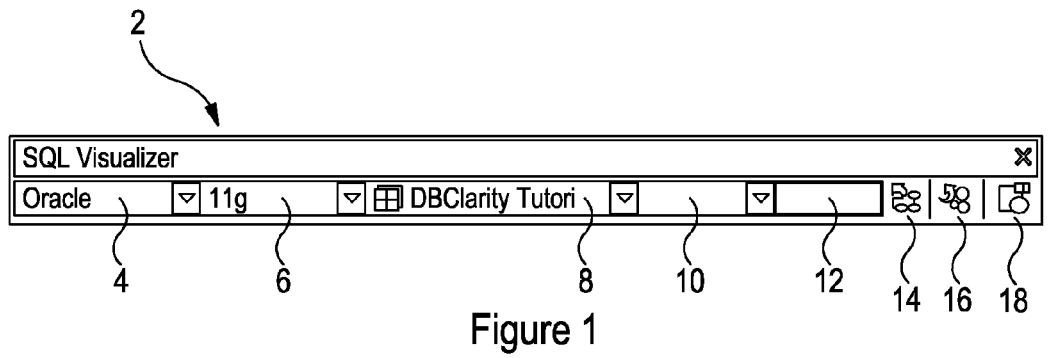
FIG. 1 shows a toolbar of a SQL Visualizer described below.

We first note that each feature disclosed or illustrated in the present specification may be incorporated in the invention, whether alone or in any appropriate combination with any other feature disclosed or illustrated herein.

We describe a SQL Visualization tool, hereinafter referred to as a SQL Visualizer, (which can be part of Microgen Aptitude as noted above). The SQL Visualizer can import database entities (SQL statements and procedures) in textual form to Microgen Aptitude and transform them from textual form to a graphical form in the proprietary format of Aptitude SQL Rules and Aptitude SQL Procedures.

The SQL Visualizer can provide the following functions:

Creating Aptitude SQL Rules diagrams from textual SQL statements; and/or

Creating Aptitude diagrammatic SQL Procedures, database tables, views and sequences from textual SQL procedures.

SQL Rules and SQL Procedures are two types of Aptitude graphical diagrams. Aptitude SQL Rules are used to graphically represent SQL select statements (querying the database) and DML (Data Manipulation Language) statements changing data—such as insert, update and delete statements.

Aptitude SQL Procedure diagrams are used to graphically represent database SQL procedures, which are not written in SQL. The stored procedures were invented to control the usage of Select and DML statements. They are close to a programming language (for instance, the stored procedure language for Oracle is called PL-SQL). They may call other stored procedures, SQL select statements, DML statements like insert, update, delete and also other database commands, like DDL (Data Definition Language) commands. DDL commands include e.g. statements creating database tables, views and also stored procedures. Databases have separate engines to execute SQL and stored procedures.

The new Aptitude functionality, i.e. the SQL Visualizer, makes it possible to convert the native database's SQL, DML, DDL and native stored procedure commands, which are in textual form, to a graphical representation used in Aptitude, as follows:

a) SQL select statements, and DML statements like insert, update and delete statements can be converted into Aptitude SQL Rules; and b) Native stored procedure code and DDL commands creating stored procedures, tables or views can be converted into Aptitude SQL Procedures, which may contain blocks calling other Aptitude SQL Procedures, and blocks creating tables or views. Typically, database stored procedures contain a lot of embedded SQL select and DML (insert, update etc.) statements, which are converted by SQL Visualizer to SQL Rules, which are then referred (using graphical blocks) from the parent SQL Procedure diagram. In this way, the created Aptitude SQL Procedures (after the conversion) typically contain blocks representing calls to Aptitude SQL Rules (of select, insert, update etc. type), created as a result of the conversion of the DML parts of the master SQL Procedure.

The textual SQL Procedure usually contains embedded SQL Statements. For such SQL Statements we produce separate SQL Rules that are then used in the diagrammatic SQL Procedure blocks (e.g. Loop, Select, Insert, Update, Delete and Merge). SQL Procedures may also use other SQL Procedures. If we find such a call we first try to find the definition of that procedure (by its name) in the Project and use it in the diagrammatic Procedure block. If we do not find it we treat the call as an external one and we put its definition into the External Call Format and then use it in the diagrammatic Procedure block.

The SQL Visualizer can have a Toolbar 2, shown in FIG. 1. The Toolbar 2 can be accessible from a SQL Editor Toolbar within Aptitude. The SQL Visualizer Toolbar 2 can contain the following controls:

Database Type 4
Database Version 6
Database Entities Dictionary (Project, External Data Format, Data Schema or Database Server) 8
  Schema or Database Name (optional) 10
  Owner (MS SQL Server, optional) 12
  Command: Generate SQL Elements 14
  Command: SQL Rule Update 16
  Switch: Show/Hide Compilation Report 18

Figure 2:
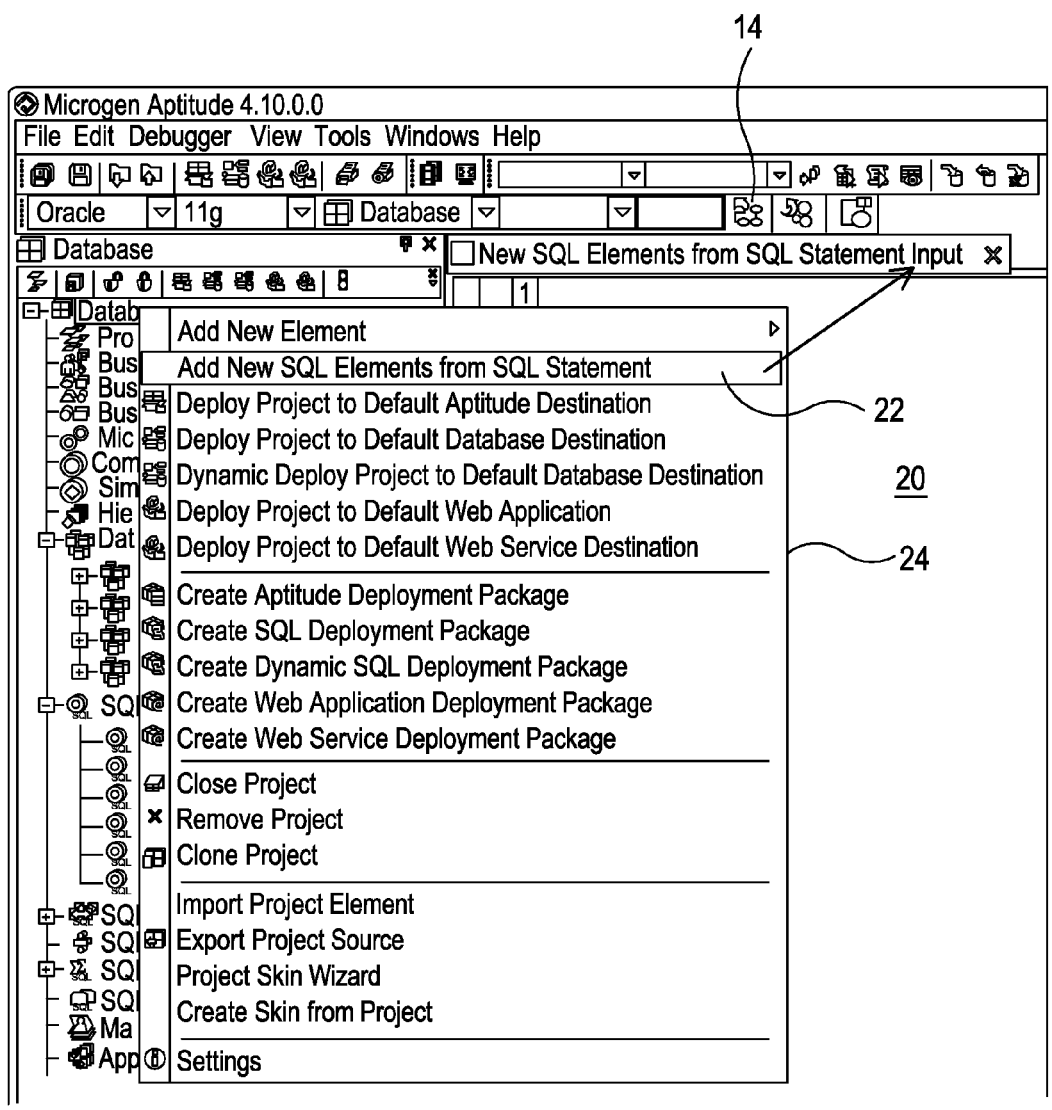
FIGS. 2 to 12 are representations of screen shots, or partial screen shots, taken from the SQL Visualizer tool.

A SQL Editor 20 can be opened using an "Add New SQL Elements from SQL Statement" command 22 from a context menu 24 as shown in FIG. 2.

After opening the SQL Editor 20, the user must put the textual SQL statement into the SQL Editor 20 and then run the Generate SQL Elements command 14. Any compilation errors will appear in a Compilation Report. If there are no errors, then the Add New Element dialog will pop up, where the user can name the created SQL Rule or Procedure and then add it to an Aptitude Project.

SQL Visualizer takes the first SQL statement found in the SQL Editor, or the selected text, and translates this into the diagrammatic language. The resulting diagrammatic entities can be created one by one, or the whole script can be parsed.

We now describe creating a SQL Rule from a SQL Statement. To create a SQL Rule from a SQL Statement the user needs to open a special SQL Editor 20 as shown in FIG. 2.

Figure 3:
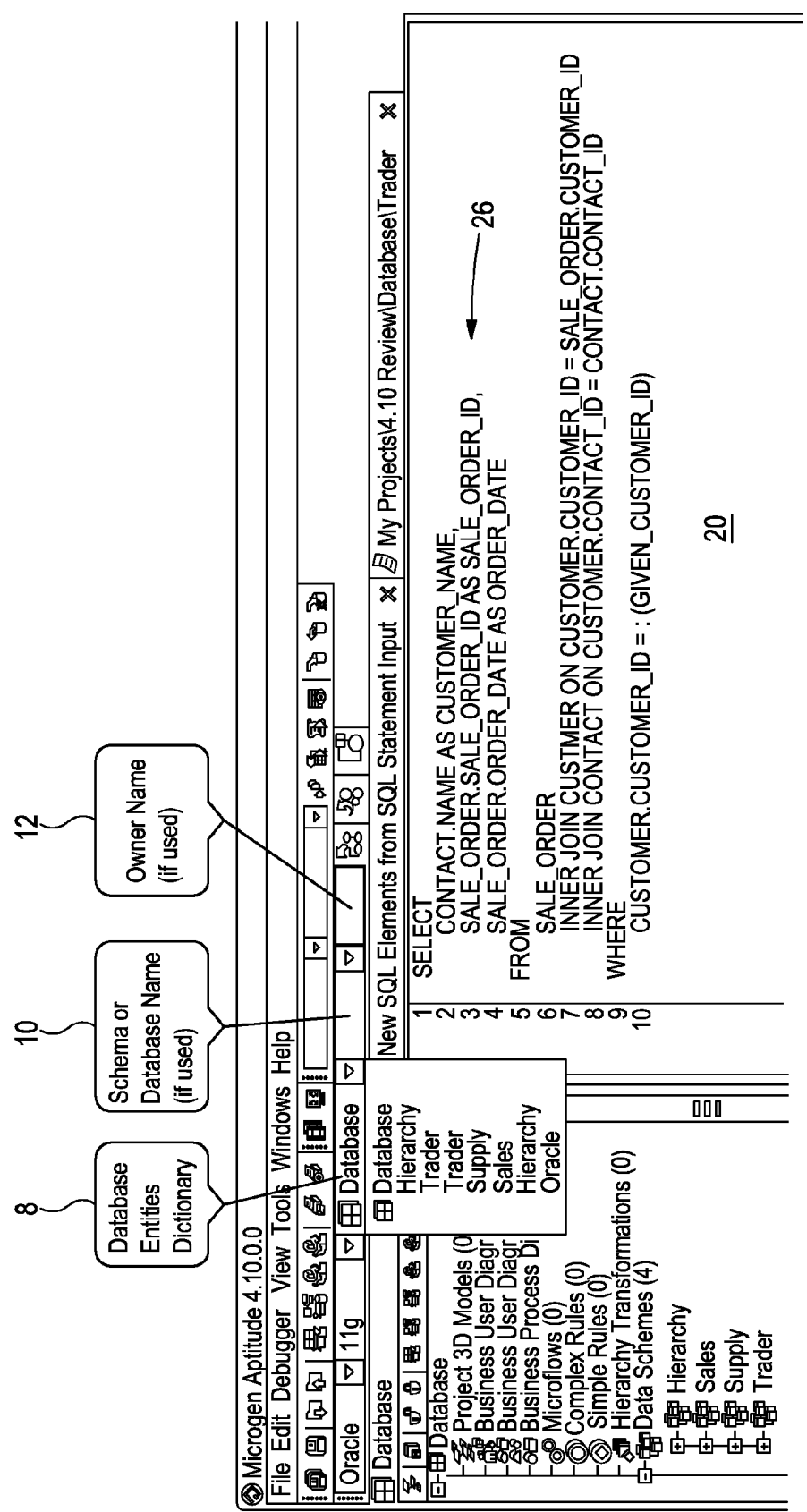

The user puts the textual SQL Statement 26 into the SQL Editor 20 as shown in FIG. 3. Then the user can select the Dictionary control 8. The Dictionary provides definitions for a set of the database entities (tables) that might be used in the textual SQL Statement. These definitions are necessary to create an Aptitude SQL Rule from the SQL textual statement, because they provide information that is not present in the SQL statement (e.g. the SQL statement may use a table name but we need the table definition to create a functional Aptitude SQL Rule). The Dictionary is one of: Project, EDF (External Data Format), Data Schema, or Database Server, as shown in FIG. 3.

There is an assumption that the tables used in the SQL Statements 26 are already defined in the selected Dictionary 8. If the user selects EDF or Data Schema as the Dictionary, then the tables' definitions are taken from this single EDF or Data Schema. If the selected Dictionary is the Project, then table definitions are taken from one of the EDFs or Data Schemas present in the Project. If the user selects the Database Server as the Dictionary, then table definitions are taken directly from the Database or Database Schema 10 (selected by user).

To generate a new SQL Rule the user needs to press the Generate SQL Elements button 14 on the Toolbar 2.

Figure 4:
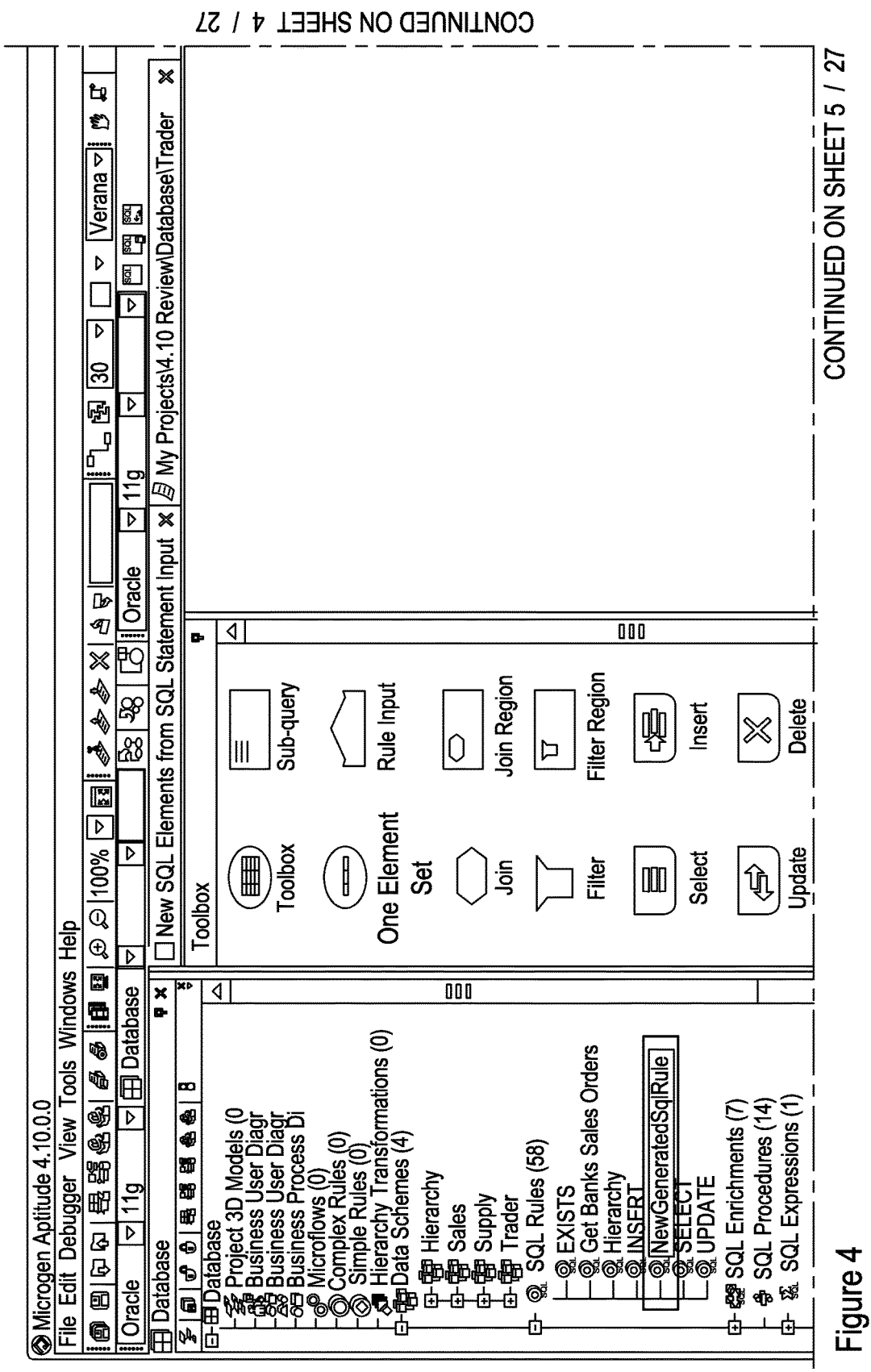
Figure 4:
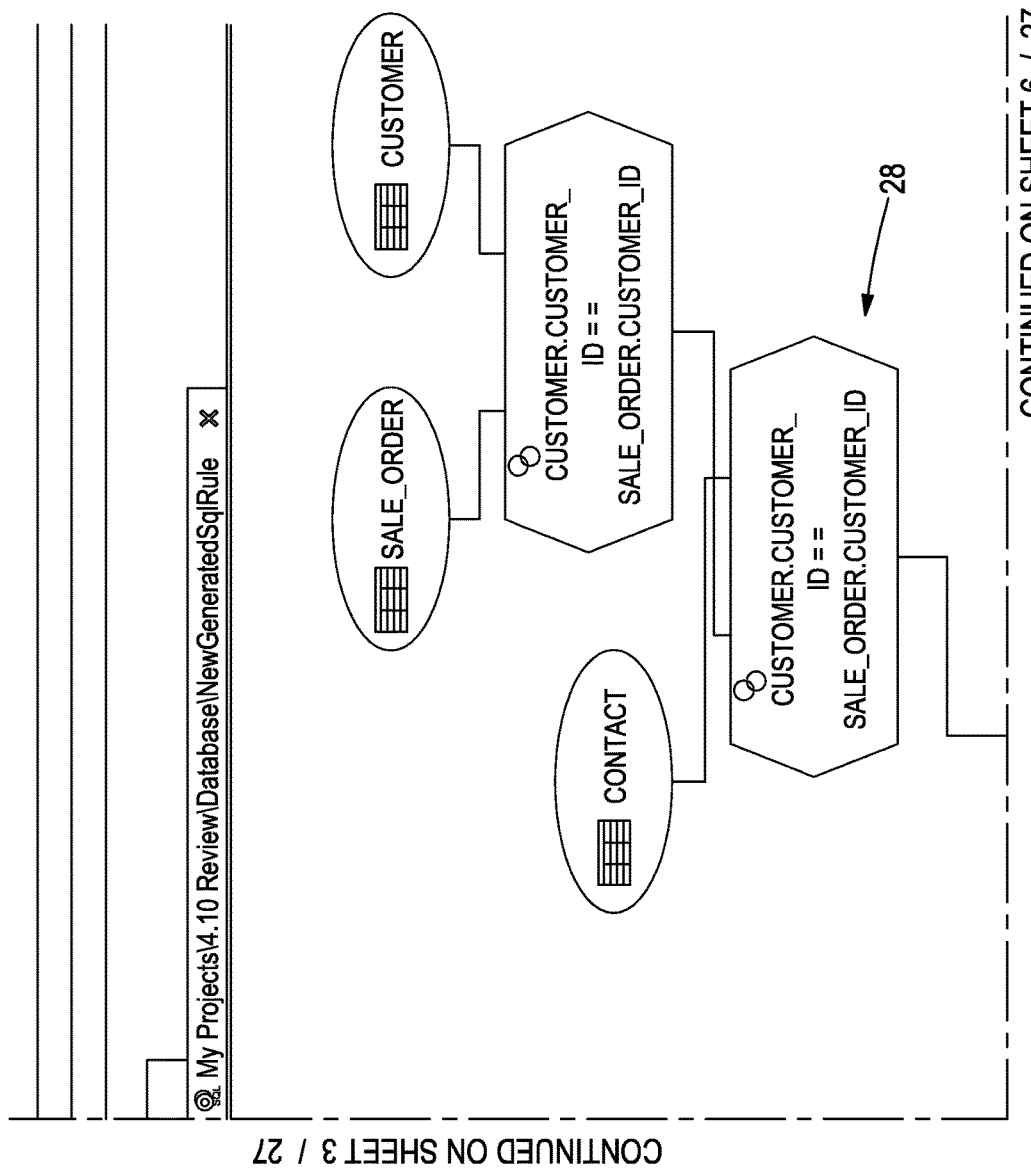
Figure 4:
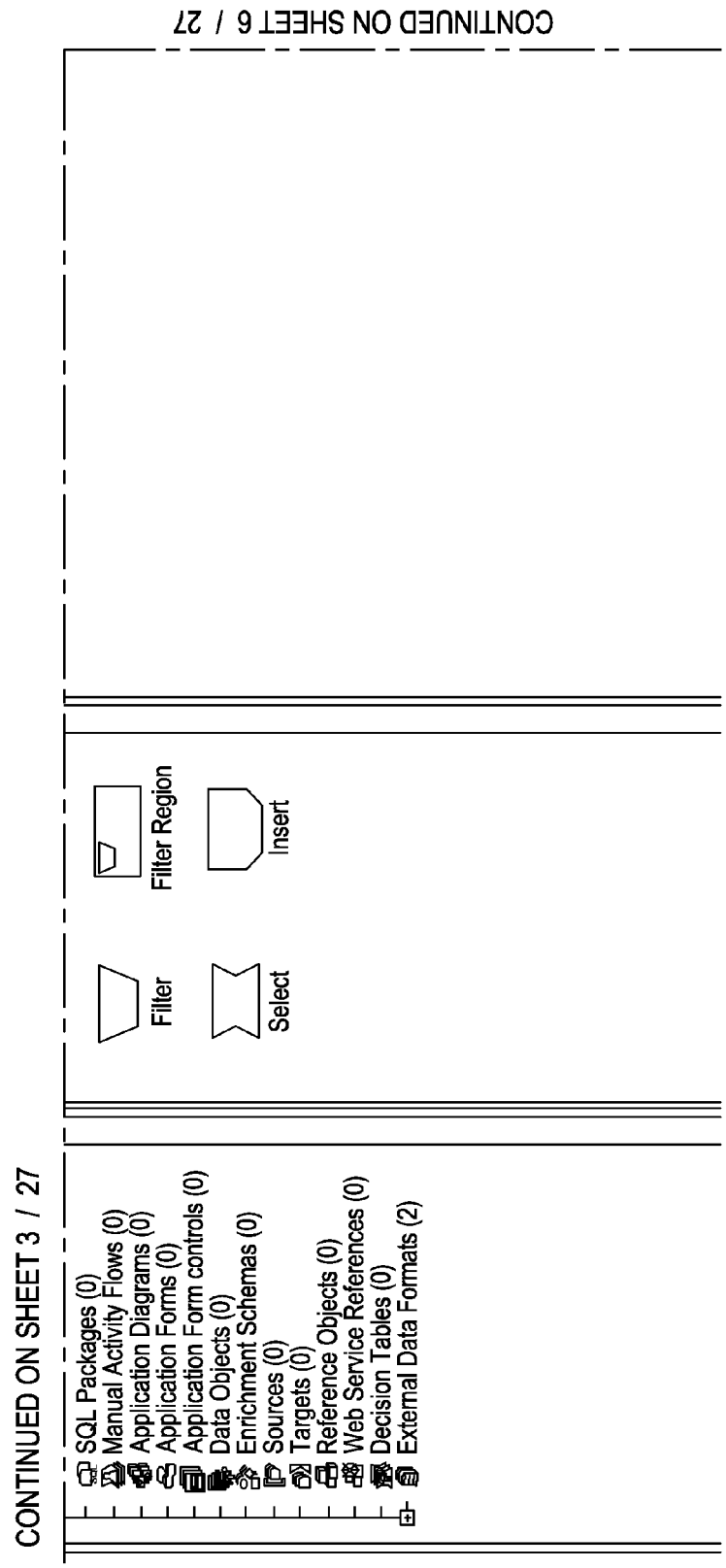
Figure 4:
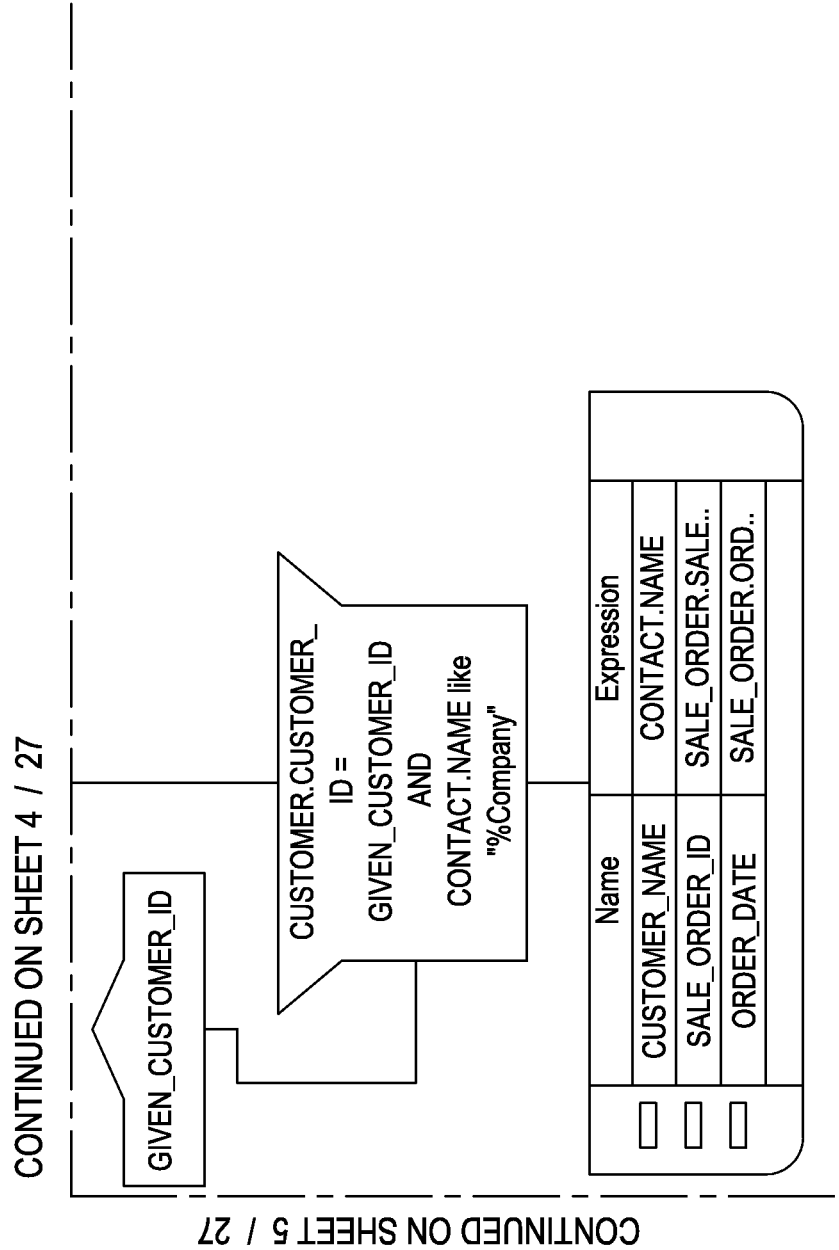

The user then has an opportunity to name the SQL Rule (in this example the name "NewGeneratedSqlRule" is chosen by the user), and then the newly generated SQL Rule 28 is added to the Project, as shown in FIG. 4.

Figure 5:
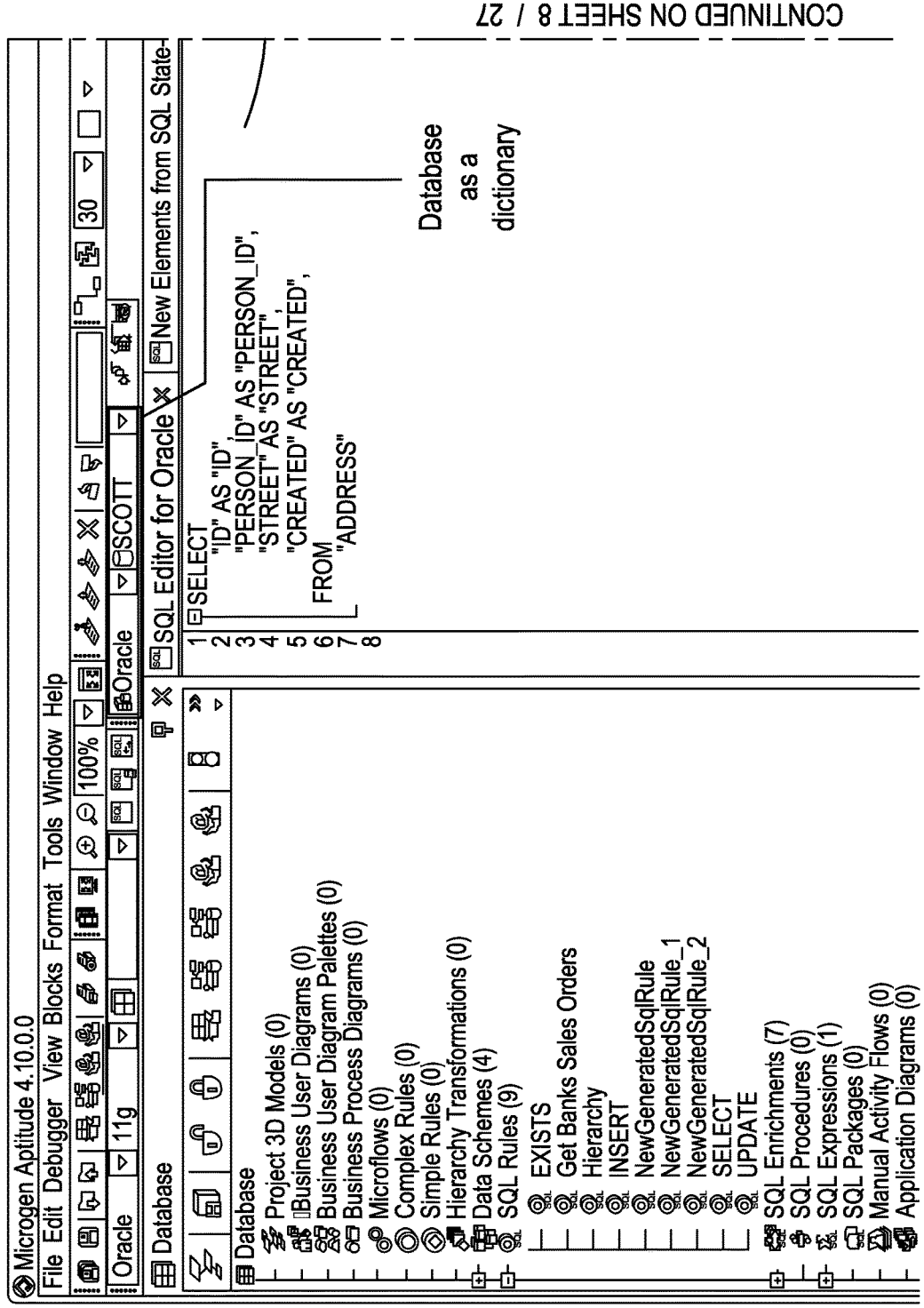
Figure 5:
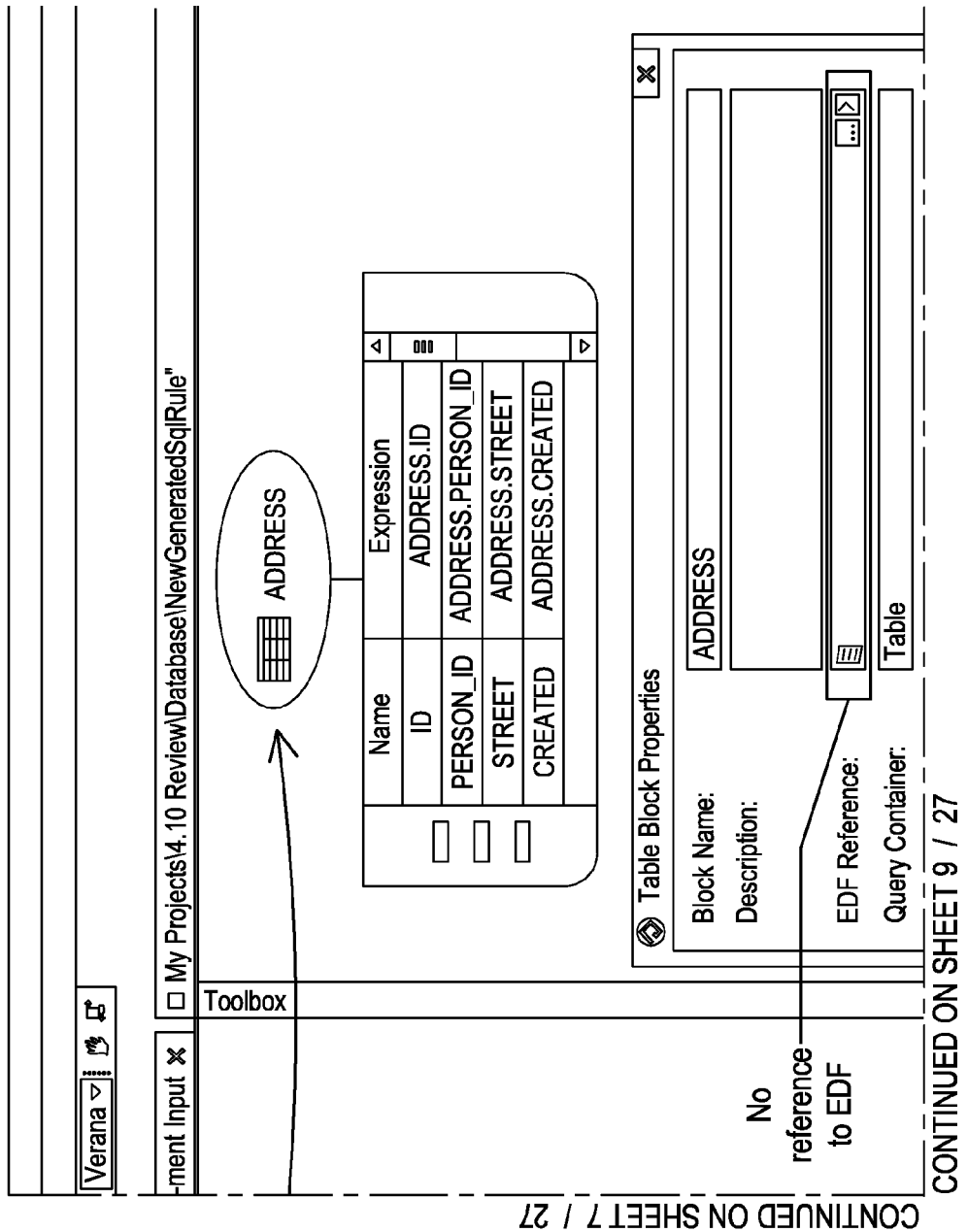
Figure 6:
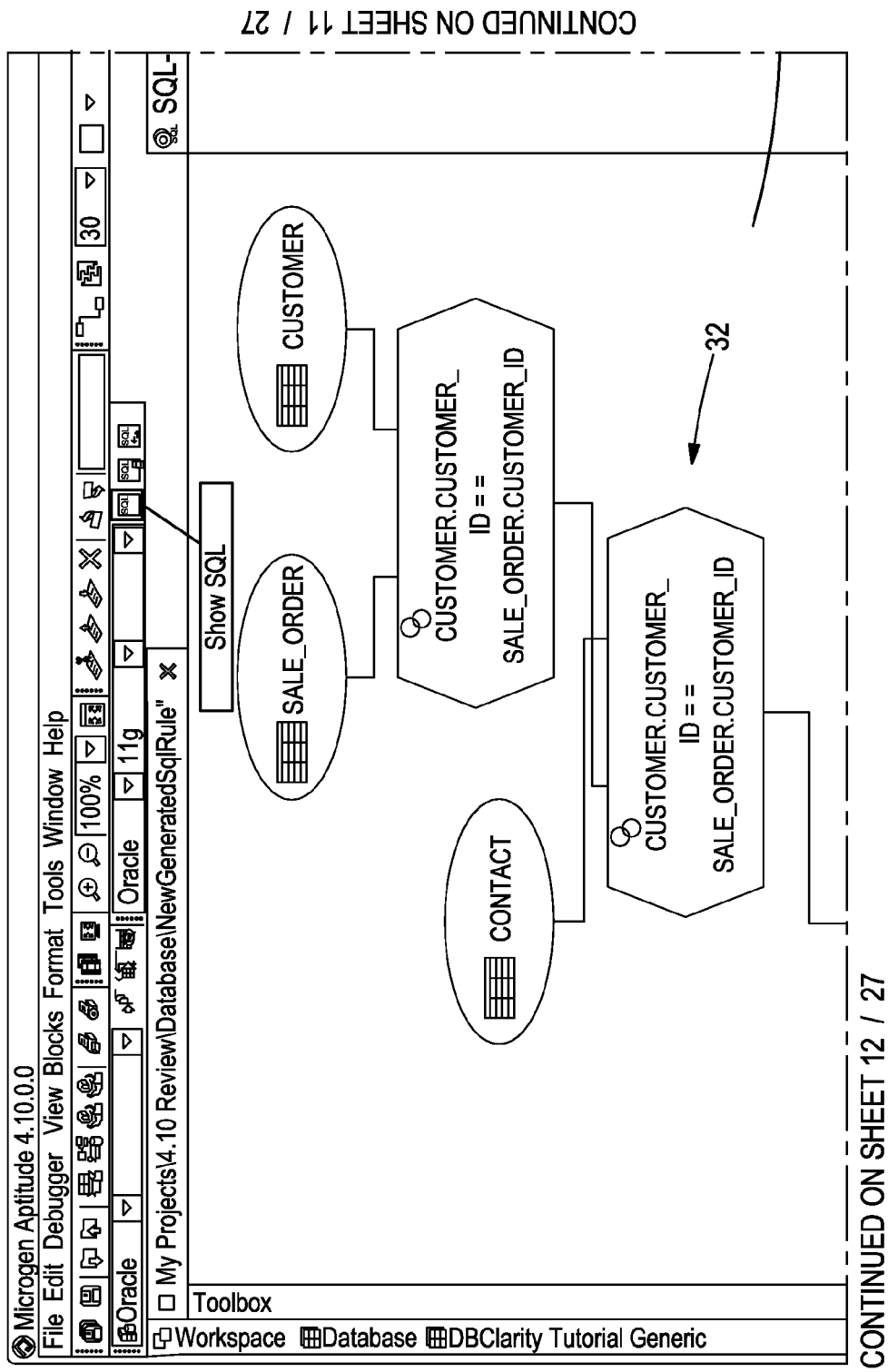
Figure 6:
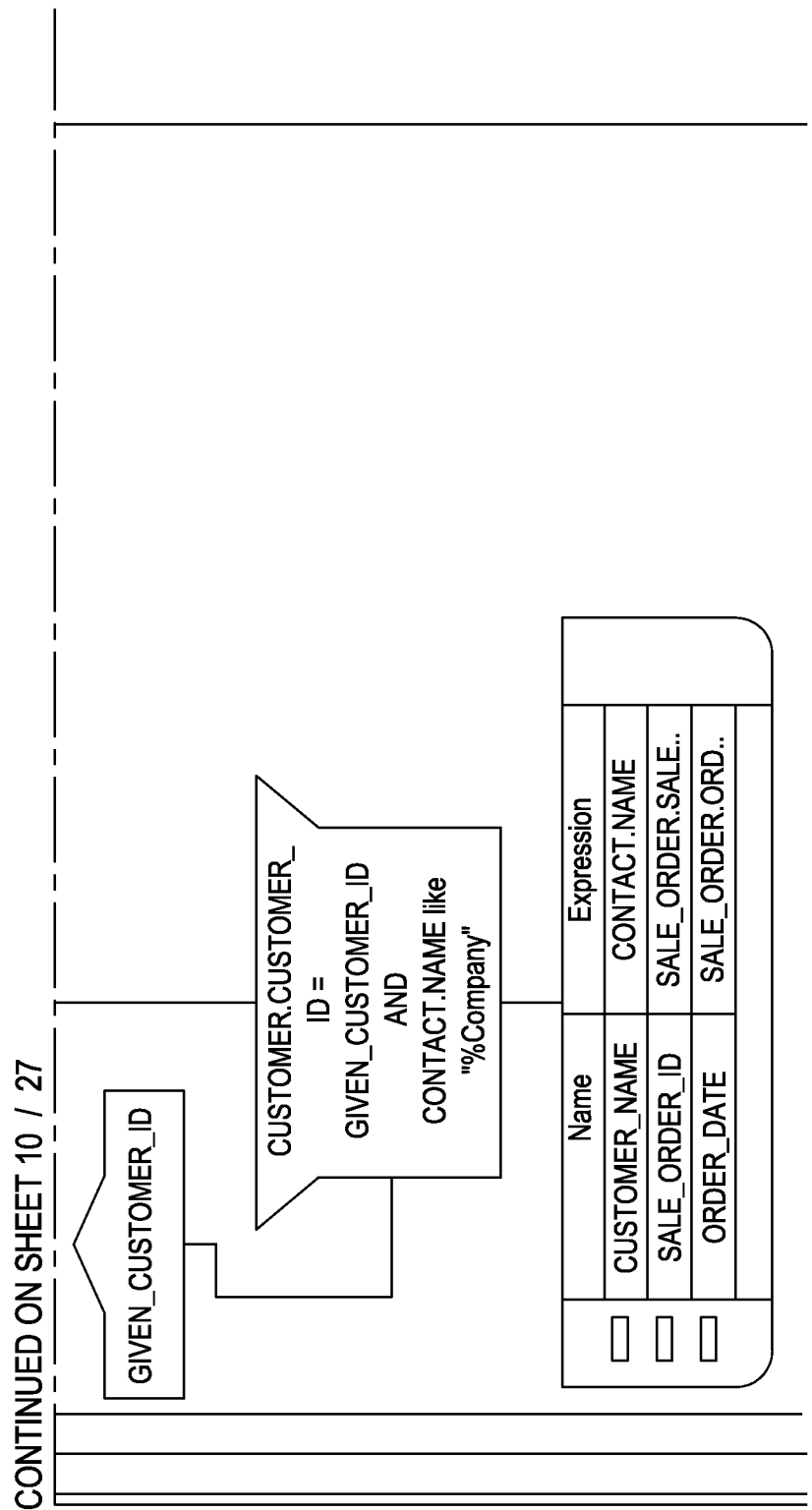

It is also possible to choose the Database Server as a Dictionary. In such a case the SQL Rule would not have references to the EDF's Tables. The Tables would be locally defined in the Table blocks of the SQL Rule as shown in FIG. 5.

Figure 7:
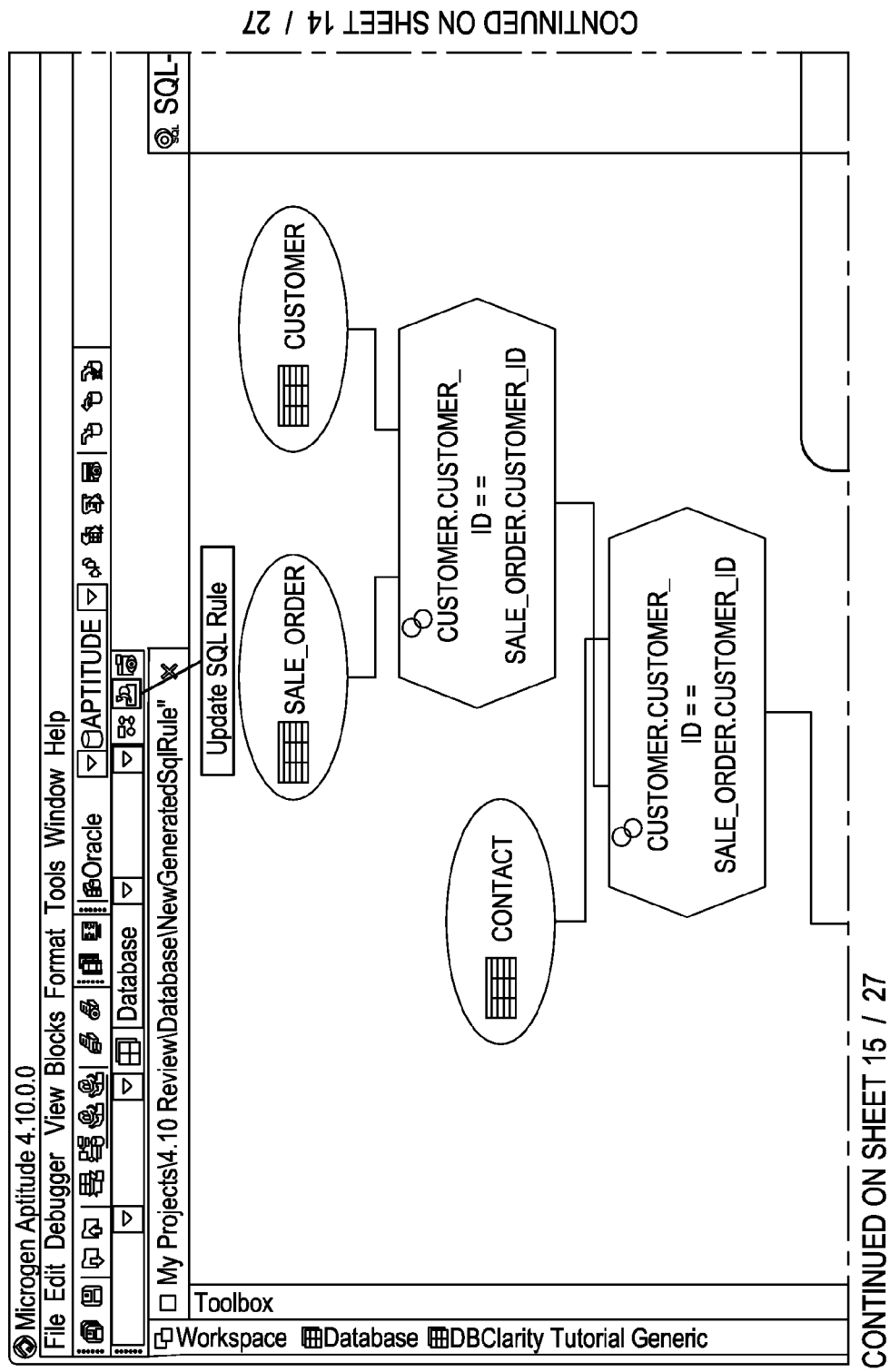
Figure 7:
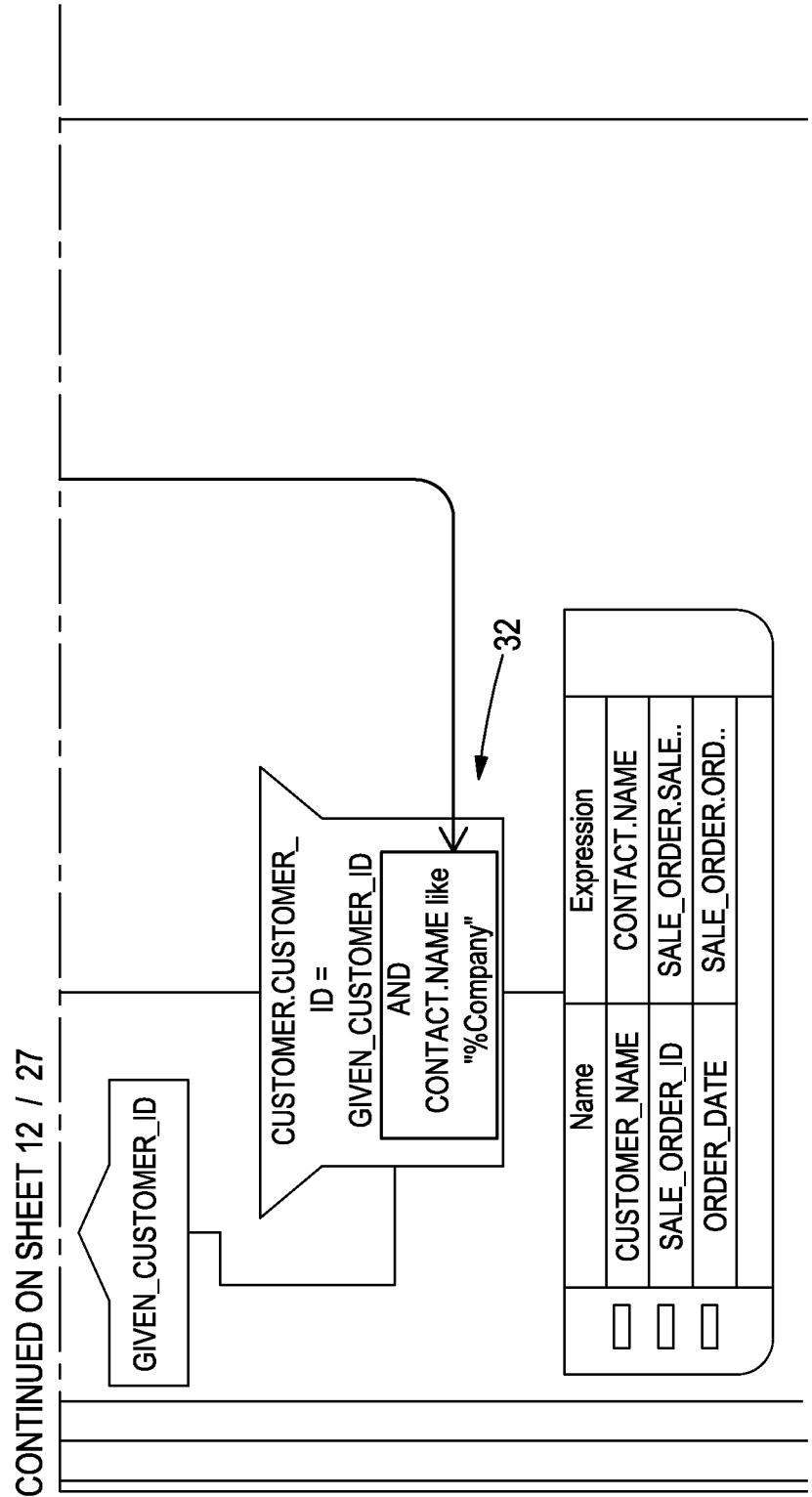

We next describe SQL Rule Update. In the SQL Visualizer, it is possible to generate a textual SQL Statement from a diagrammatic SQL Rule, then to modify the SQL Statement as a text and then update the diagrammatic SQL Rule such that the changes made in the textual representation are included in the diagrammatic representation. This can be done by the following steps:

1. Generate a textual SQL Statement 30 from the graphical SQL Rule 32, as shown in FIG. 7;
2. Make changes to the text of the SQL Statement 30; and
3. Update the SQL Rule 32 to reflect changes made in the text of the SQL Statement 30, as shown in FIG. 7.

Figure 8:
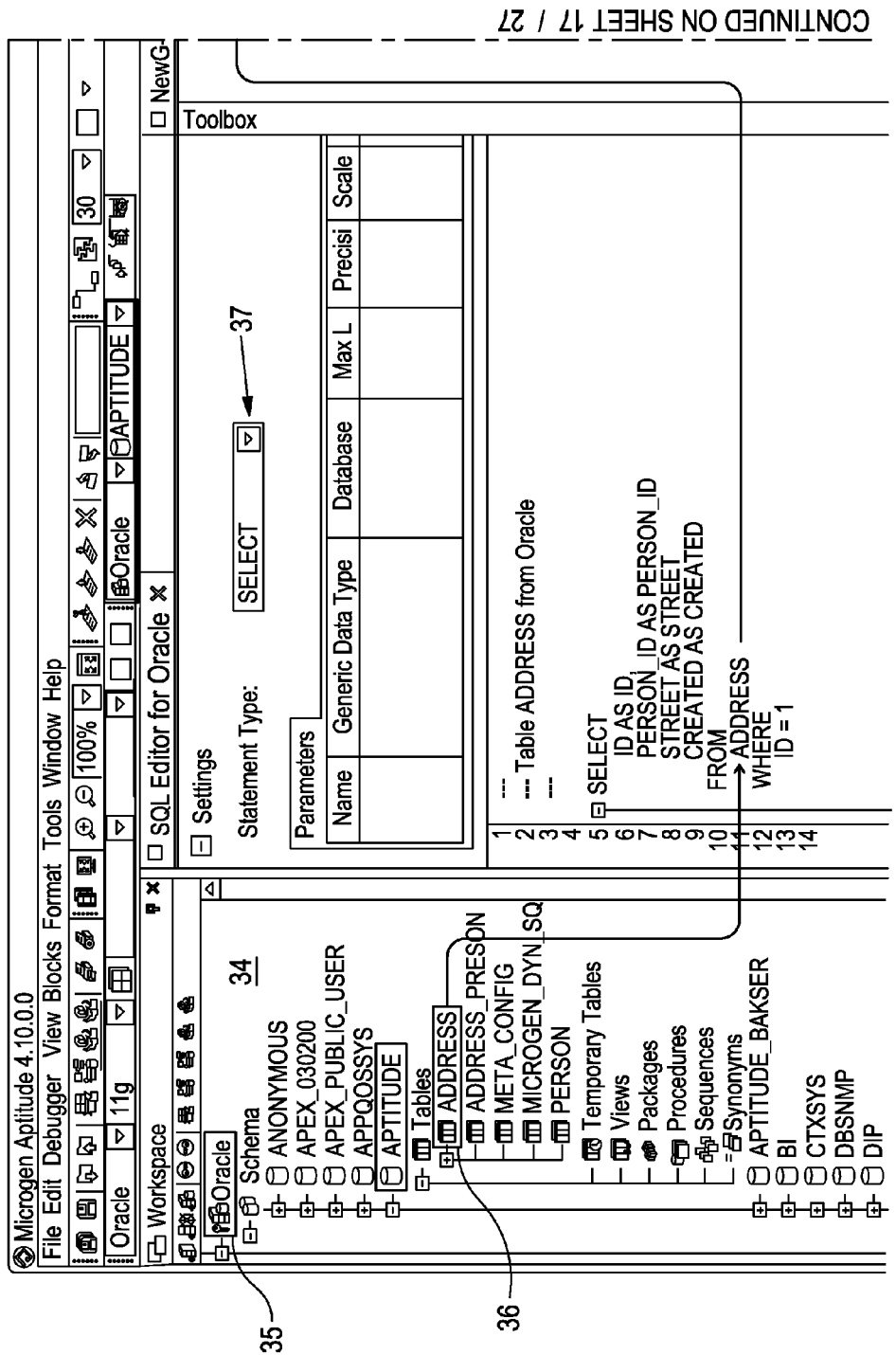
Figure 8:
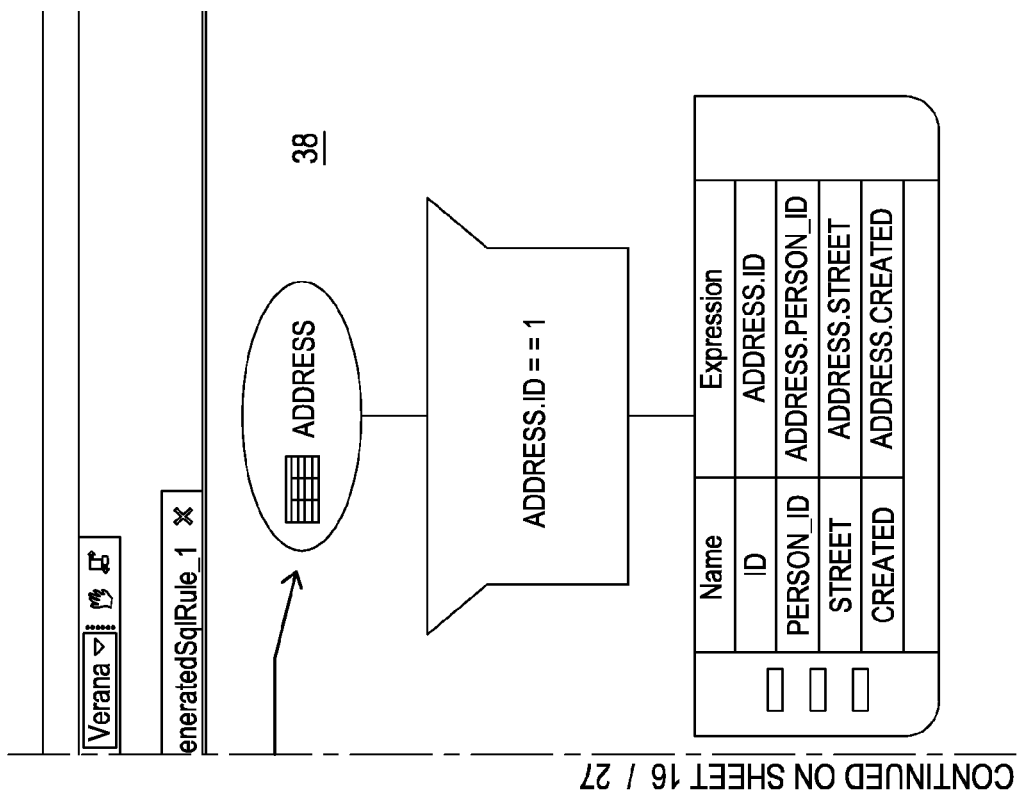

It is also possible to use the SQL Visualizer working directly with the database without the Aptitude Project environment, as shown in FIG. 8. In such a case, the User goes to the Workspace Explorer 34 and logs in to the database. Then the user expands the Database or Schema node 35 and then expands the Tables node, finally selecting one of the tables 36. The User can then drag the selected Table onto the SQL Editor 20 and then a simple SQL statement of the type defined by the combo Statement Type 37 is created by Aptitude. User can modify the statement using the SQL Editor. The statement type can be one of: Select, Inset, Update, Delete or Merge. The User can then convert the statement into diagrammatical SQL Rule 38 after running the Generate SQL Elements command 14.

Figure 9:
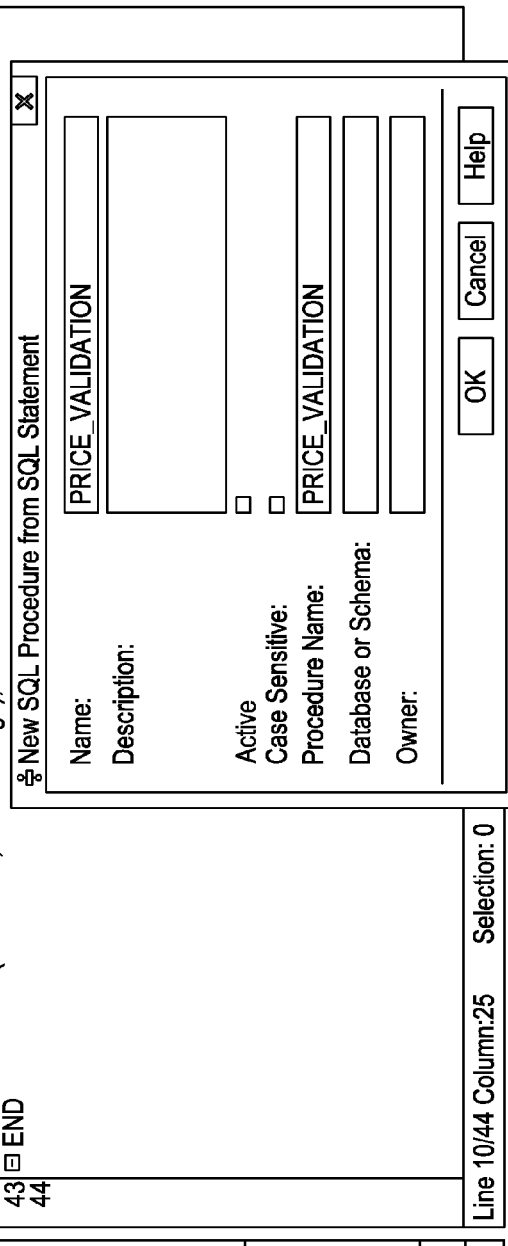

We next describe creating a SQL Procedure Diagram from SQL Procedure text or a DDL Statement. The first steps are the same as for creating a new SQL Rule from a SQL Statement described above, but more objects are created (SQL Procedure, and accompanying SQL Rules, table, views and sequence definitions). The SQL Editor 20 is opened as described above for FIG. 2. When the diagrammatic SQL Procedure is created, the user is asked to give the new SQL Procedure a name, and in this example the name PRICE VALIDATION is chosen, as shown in FIG. 9.

Figure 10:
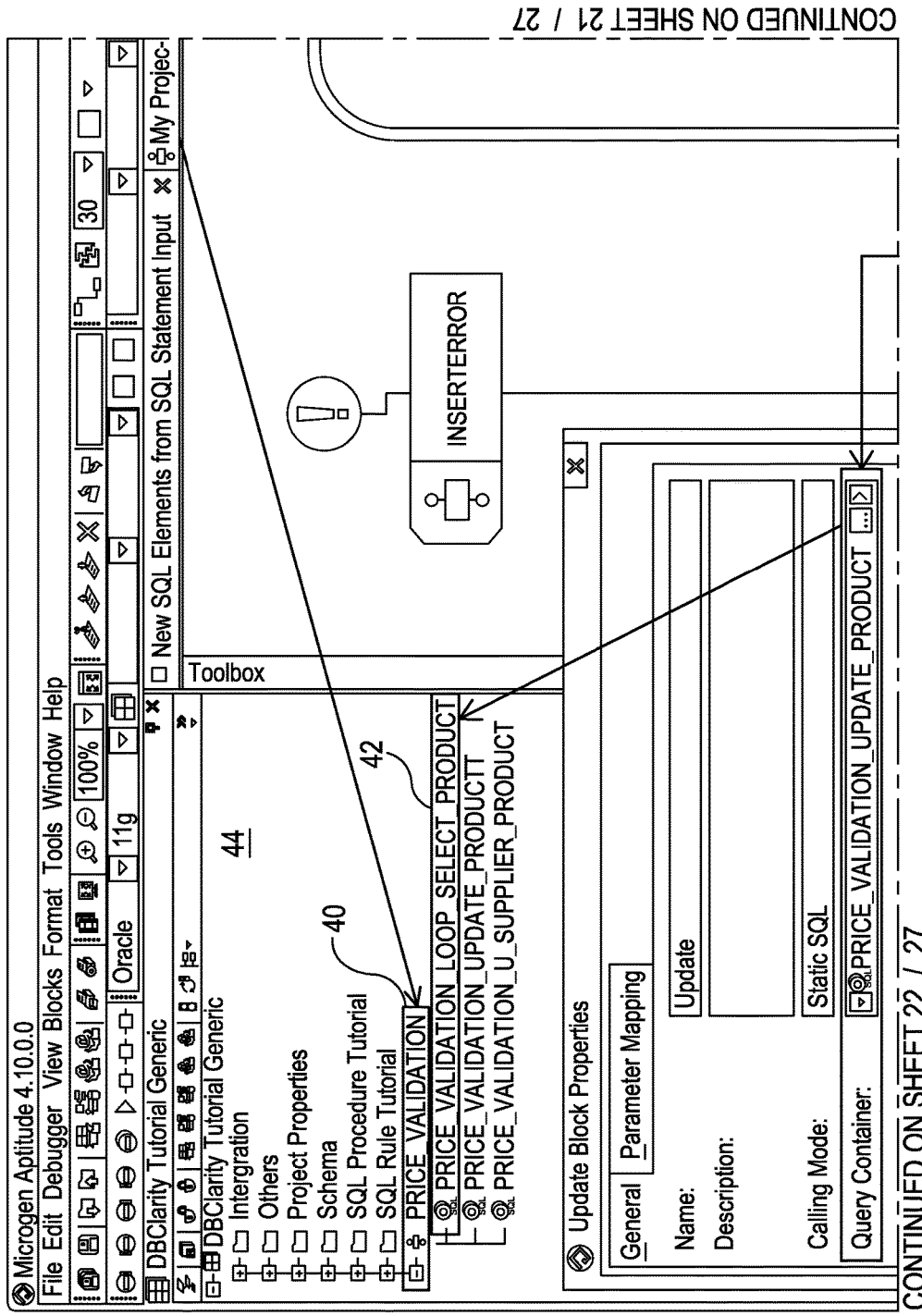
Figure 10:
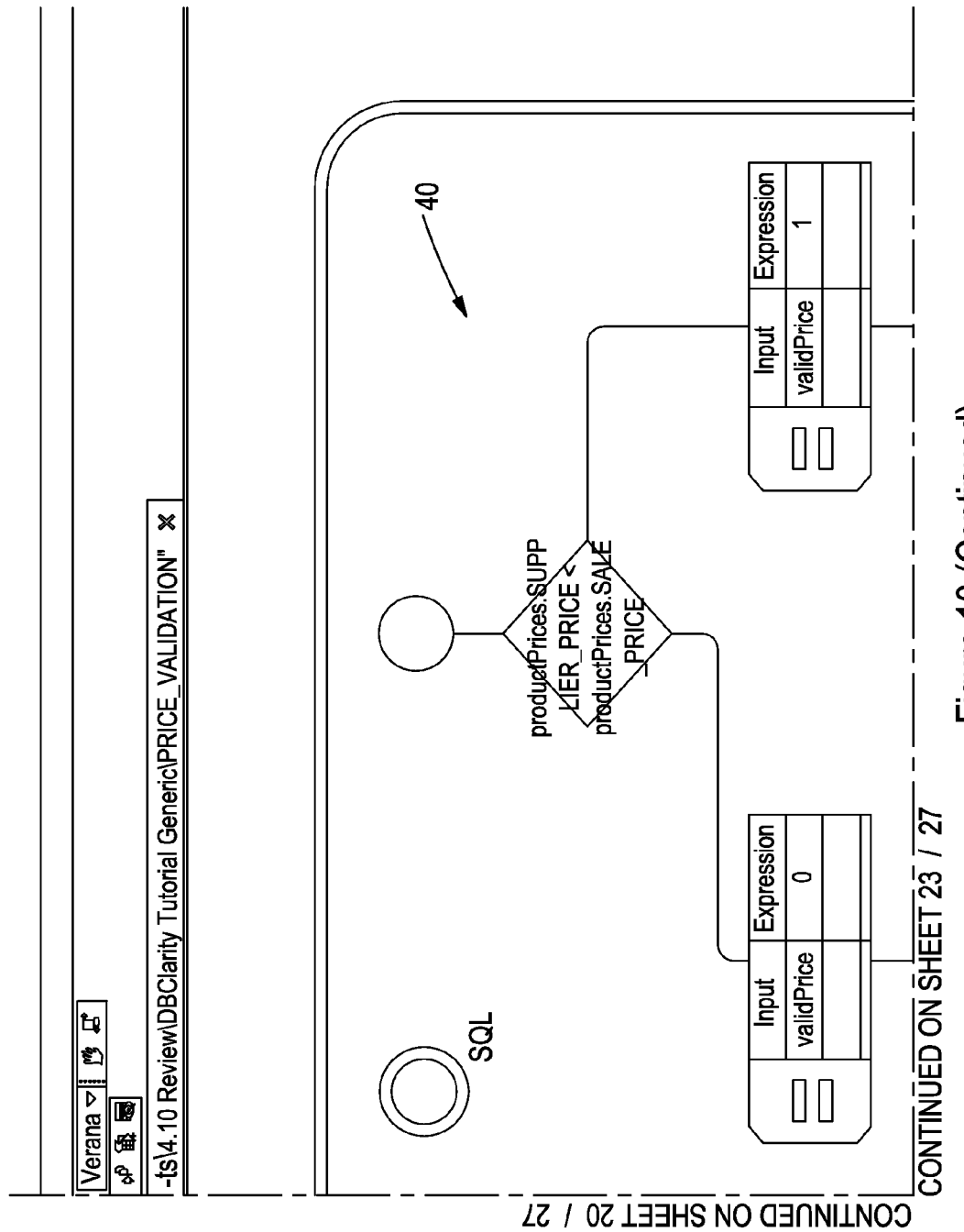
Figure 10:
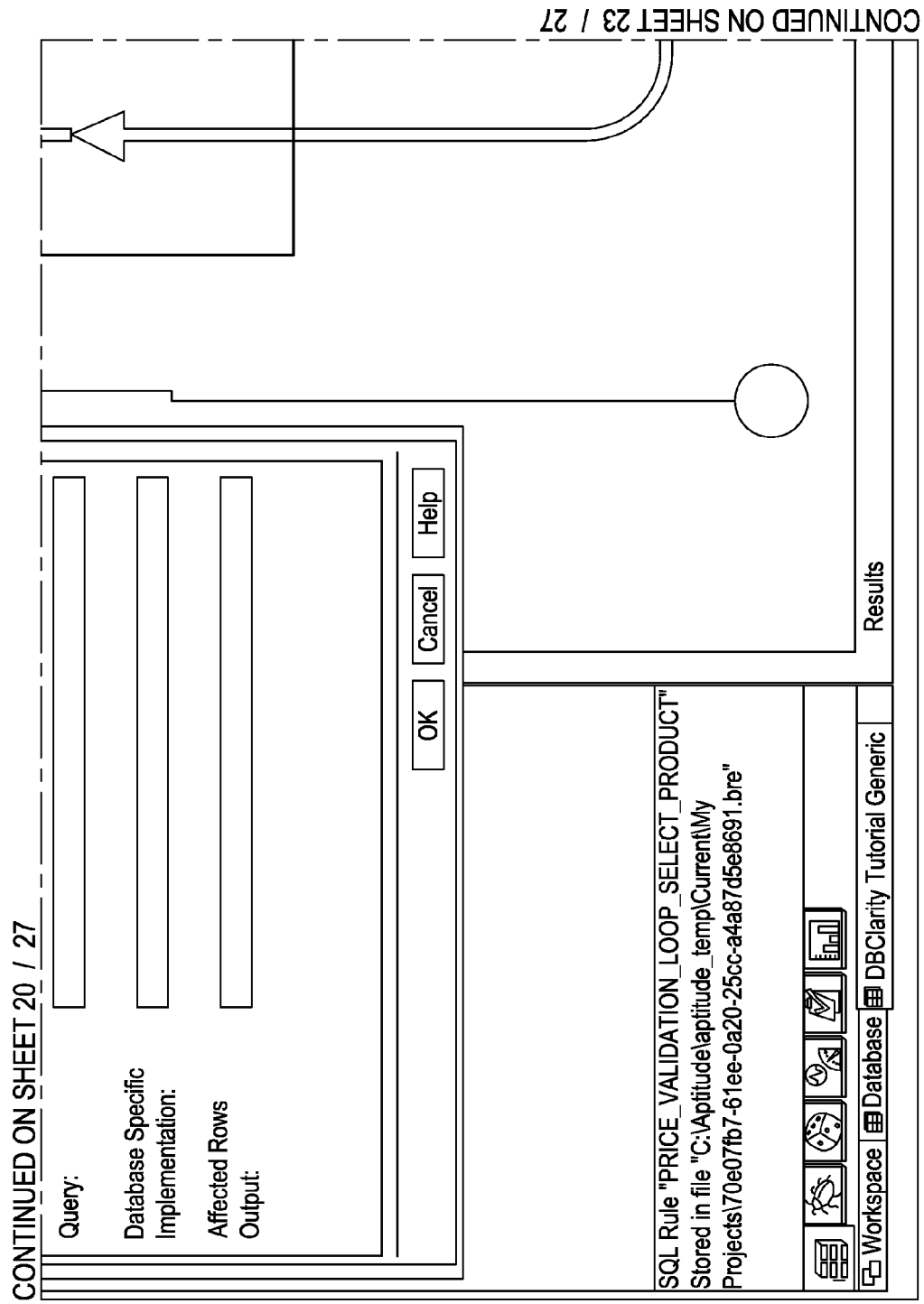
Figure 10:
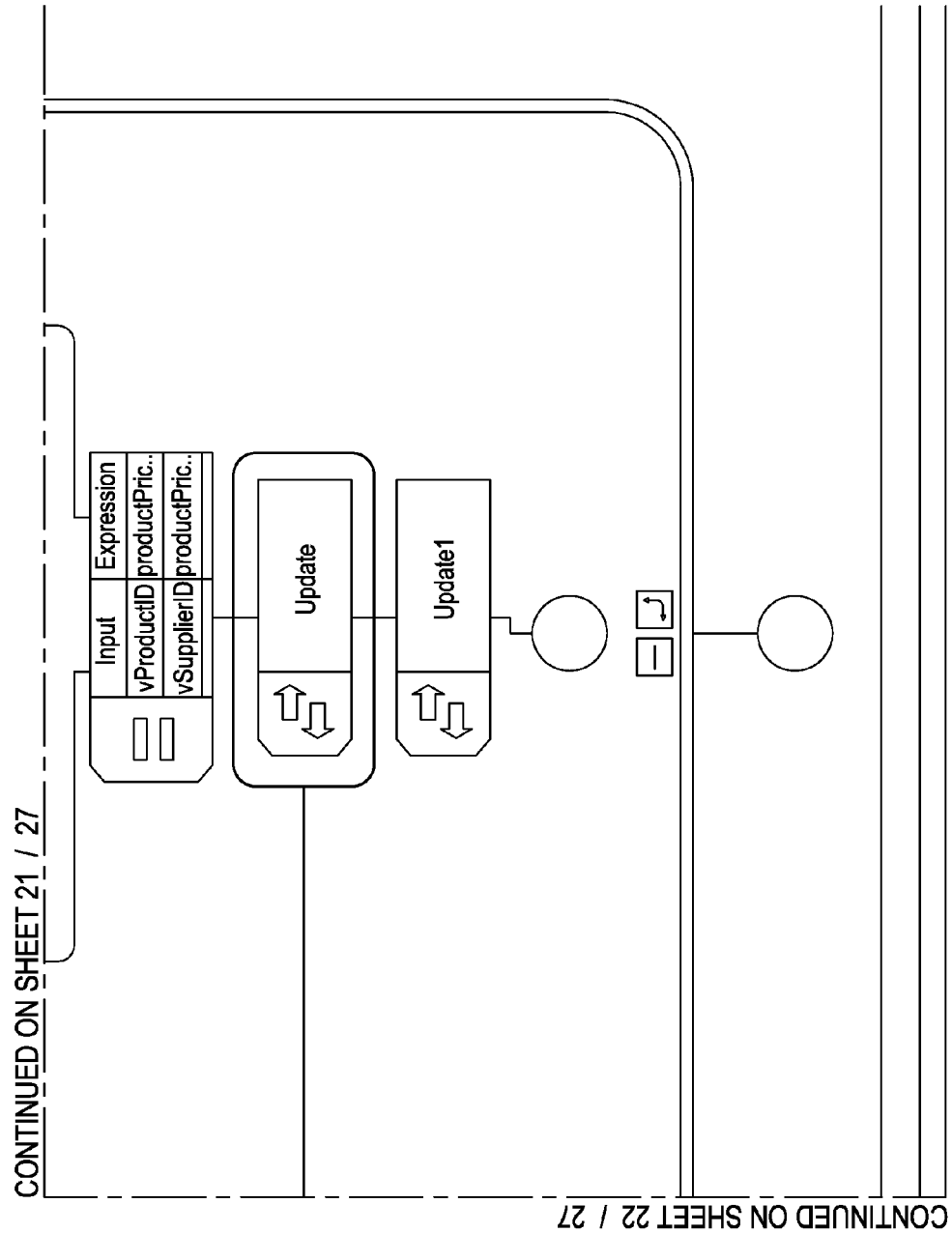

The Generated diagrammatic SQL Procedure 40 is added to the Project together with its diagrammatic SQL Rules 42. The SQL Rules 42 are added as child nodes of the SQL Procedure 40 in the Project Folders View 44, as shown in FIG. 10.

We next describe importing an SQL Procedure from a database and creating a diagrammatic Aptitude SQL Procedure.

This function takes the textual SQL procedure from a database and converts it into a diagrammatic Aptitude SQL Procedure. This can be done in the following steps:

As described above for FIG. 2, the User opens a Project, right clicks the Project node in the Project Explorer and selects Add New SQL Elements from SQL Statement This opens a new window called: "New SQL Elements from SQL Statement Input", as shown in FIG. 2.

Figure 11:
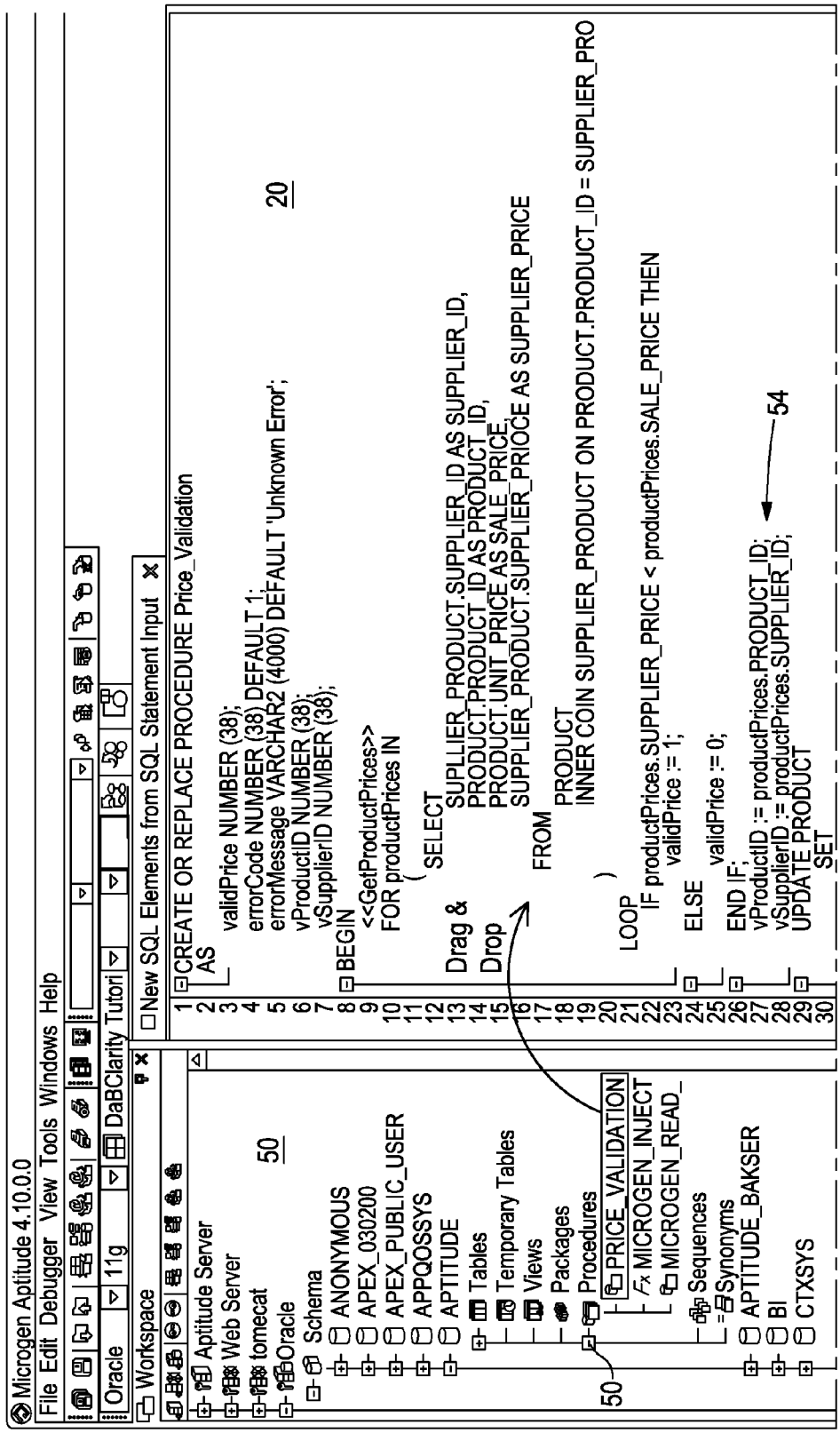

As shown in FIG. 11, the User goes to the Workspace Explorer 50 and logs in to the database. Then the user expands the Procedures node 52 (showing the procedures existing in the database), finds the Procedure the user wants to import to the Aptitude Project (in this example it is called PRICE VALIDATION), drags this Procedure and drops it into the editor window 20 opened in the previous step. The editor window 20 now contains the textual SQL Procedure 54, named PRICE VALIDATION.

The user executes Generate SQL Elements toolbar command 14. The user is asked for the name of the newly generated SQL Procedure, and in this example again chooses the name PRICE VALIDATION.

Figure 12:
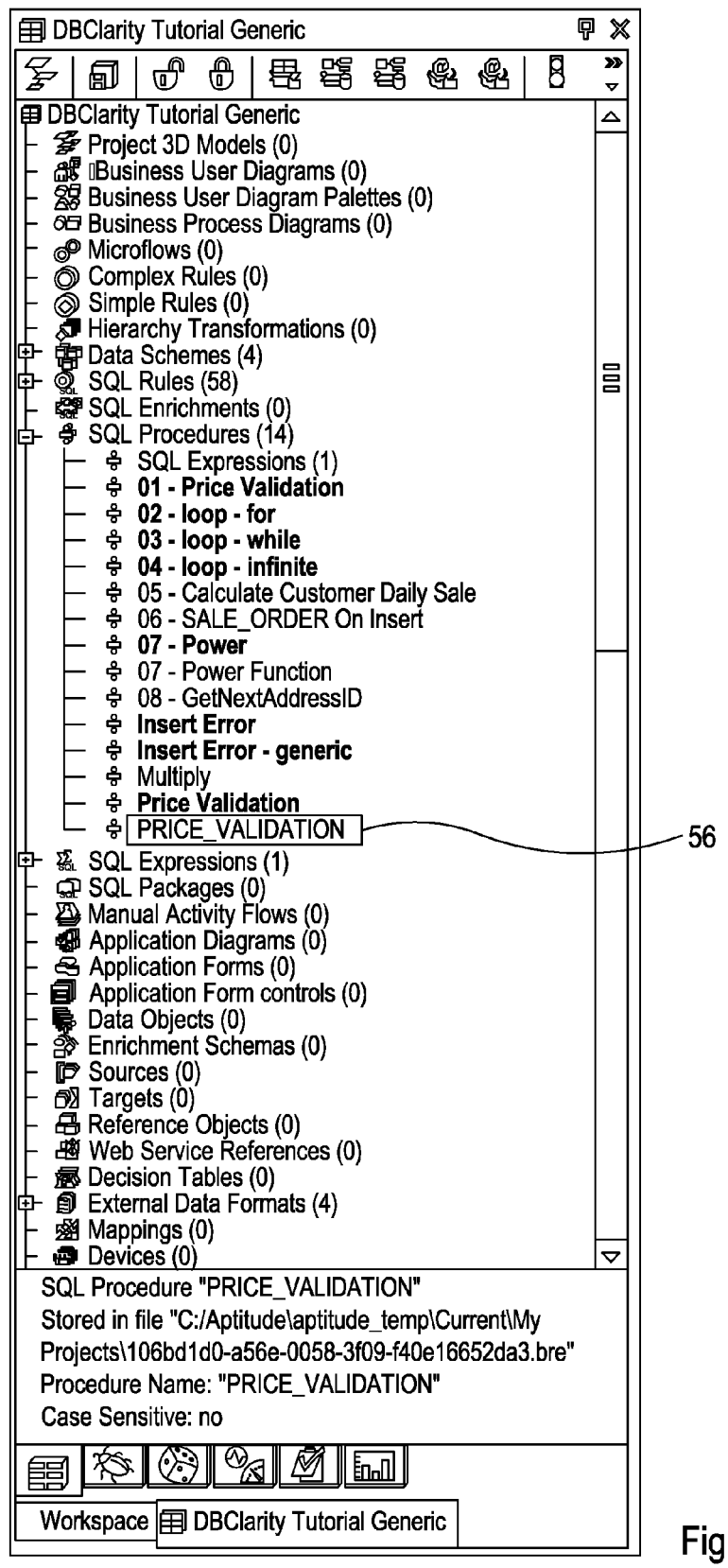

The generated diagrammatical Aptitude SQL Procedure 56 is added to the Aptitude Project, as shown in FIG. 12.

Figure 13:
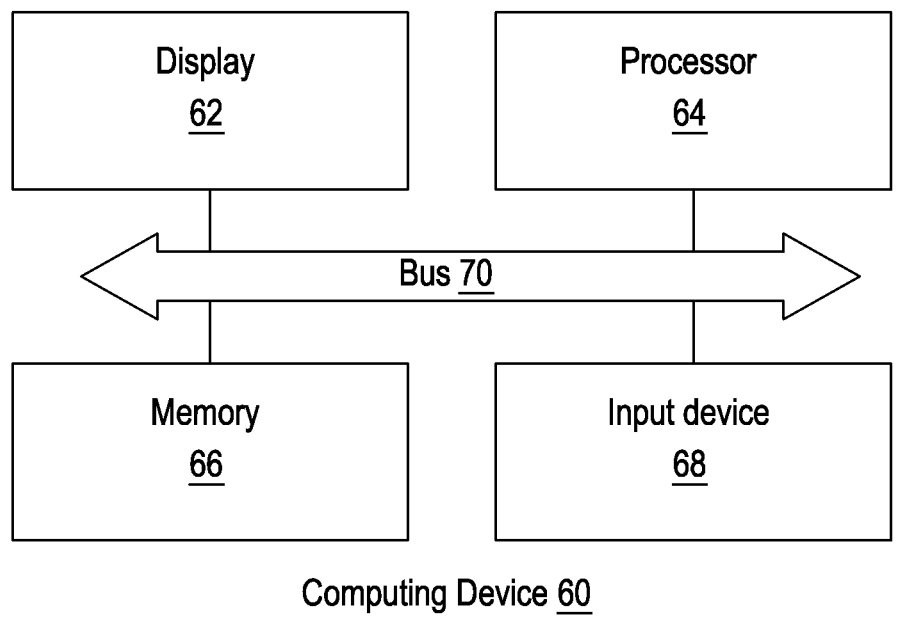
FIG. 13 shows a computing device 60 suitable for running the Aptitude 3D software, and for implementing the Visualization tool described herein.

FIG. 13 shows a computing device 60, which may for example be a personal computer (PC), which is suitable for running the Aptitude 3D software. The computing device 60 comprises a display 62 for displaying information to the developer, a processor 64, a memory 66 and an input device 68 (for example a mouse and/or keyboard) for allowing the developer to input information. These elements are connected by a bus 70 via which information is exchanged between the components.

Having described the invention in detail and by reference to certain embodiments, it will be apparent that modifications and variations thereof are possible without departing from the scope of the invention.

What is claimed is:

1. A structured query language (SQL) Visualizer, comprising:
    a processor of a computer system, wherein the processor is arranged to cause the computer system to transform a textual SQL statement into a graphical diagram which represents said textual SQL statement;
    said SQL Visualizer being arranged:
        a) to cause the computer system to transform a textual SQL procedure into a graphical diagram which represents said textual SQL procedure such that the structure of the SQL procedure is visually represented in said graphical diagram; and
        b) to transform a textual data manipulation language (DML) statement into a graphical diagram which represents the logic of said textual DML statement;
    wherein said textual DML statement includes an insert, update or delete, statement;
    wherein said graphical diagram which represents the logic of said textual DML statement includes at least an insert, update or delete icon; and
    wherein the SQL Visualizer further comprises a user interface, wherein said user interface comprises a dictionary selection control which allows a user to select a database used in said textual SQL statement, and to thereby provide a definition for said database for use in transforming said textual SQL statement into said graphical diagram which represents said textual SQL statement.

2. A SQL Visualizer as claimed in claim 1, wherein said graphical diagram which represents said textual SQL statement is a graphical SQL Rule.

3. A SQL Visualizer as claimed in claim 1, wherein said graphical diagram which represents said textual DML statement is a graphical SQL Rule.

4. A SQL Visualizer as claimed in claim 1, wherein said graphical diagram which represents said textual SQL statement and said graphical diagram which represents said textual DML statement are both contained in the same graphical SQL Rule.

5. A SQL Visualizer as claimed in claim 1, wherein said graphical diagram which represents said textual SQL procedure is a graphical SQL Procedure.

6. A SQL Visualizer as claimed in claim 5, wherein if said textual SQL procedure contains embedded SQL statements, said means for transforming a textual SQL procedure into a graphical diagram automatically produces separate graphical SQL Rules corresponding with said embedded SQL statements, that are placed within the graphical SQL Procedure.

7. A SQL Visualizer as claimed in claim 1, which further comprises means for transforming a textual data definition language (DDL) command into a graphical diagram which represents said textual DDL command.

8. A SQL Visualizer as claimed in claim 7, wherein said graphical diagram which represents said textual DDL command is a graphical SQL Procedure.

9. A SQL Visualizer as claimed in claim 7, wherein said graphical diagram which represents said textual DDL command is a graphical SQL Procedure and wherein said graphical diagram which represents said textual SQL procedure and said graphical diagram which represents said textual DDL command are both contained in the same graphical SQL Procedure.

10. A SQL Visualizer as claimed in claim 1, which further comprises a user interface comprising an editor into which a user may place textual elements prior to their conversion into graphical form.

11. A SQL Visualizer as claimed in claim 10, wherein said editor is arranged to receive textual SQL statements, DML statements, SQL procedures and/or DDL commands.

12. A SQL Visualizer as claimed in claim 1, wherein said dictionary selection control allows selection of at least one of the following: Project, EDF (External Data Format), Data Schema, and Database Server.

13. A SQL Visualizer as claimed in claim 1, which also allows a user to create textual SQL statements and SQL procedures from graphical SQL Rules and SQL Procedures.

14. A SQL Visualizer as claimed in claim 13, which allows a user to switch between textual and graphical representations of the same SQL statement or SQL procedure.

15. A SQL Visualizer as claimed in claim 1, in which a user can make changes to either the graphical or the textual representation of a SQL statement or SQL procedure, and the SQL Visualizer can then automatically generate the other of the graphical or the textual representation such that the same change is incorporated in both the textual representation and the graphical representation.

16. A SQL Visualizer as claimed in claim 15, wherein said graphical and textual representations are automatically synchronized.

17. A SQL Visualiser as claimed in claim 1, wherein said graphical diagram which represents said textual SQL statement comprises graphical blocks of different types, and wherein the relative position of a particular type of said graphical blocks is used to represent different SQL operations.

18. The SQL Visualiser as claimed in claim 17, wherein said particular type of said graphical blocks is used to represent a "WHERE" construct if said particular type of said graphical blocks is a filter block that is placed before a graphical block that is used to represent a "GROUP BY" construct.

19. The SQL Visualiser as claimed in claim 17, wherein said particular type of said graphical blocks is used to represent a "HAVING" construct if said particular type of said graphical blocks is a filter block that is placed after a graphical block that is used to represent a "GROUP BY" construct.

20. A SQL Visualizer executed by a processor, said SQL Visualizer comprising:
  a transformer for transforming a textual SQL statement into a graphical diagram which represents said textual SQL statement;
  said SQL Visualizer being arranged:
  a) to transform a textual SQL procedure into a graphical diagram which represents said textual SQL procedure such that the structure of the SQL procedure is visually represented in said graphical diagram; and
  b) to transform a textual data manipulation language (DML) statement into a graphical diagram which represents the logic of said textual DML statement;
  wherein said textual DML statement includes an insert, update or delete statement;
  wherein said graphical diagram which represents the logic of said textual DML statement includes at least an insert, update or delete icon; and
  wherein the SQL Visualizer further comprises a user interface, wherein said user interface comprises a dictionary selection control which allows a user to select a database used in said textual SQL statement, and to thereby provide a definition for said database for use in transforming said textual SQL statement into said graphical diagram which represents said textual SQL statement.

* * * * *